(12) United States Patent
Lim

(10) Patent No.: US 12,744,897 B2
(45) **Date of Patent: *Sep. 22, 2026**

(54) VIDEO SIGNAL PROCESSING METHOD AND DEVICE

(71) Applicant: KT CORPORATION, Gyeonggi-do (KR)

(72) Inventor: Sung Won Lim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/006,002

(22) Filed: Dec. 30, 2024

(65) Prior Publication Data

US 2025/0133205 A1 Apr. 24, 2025

Related U.S. Application Data

(63) Continuation of application No. 17/636,966, filed as application No. PCT/KR2020/011547 on Aug. 28, 2020, now Pat. No. 12,219,134.

(30) Foreign Application Priority Data

Aug. 28, 2019 (KR) ........................ 10-2019-0106040

(51) Int. Cl.
*H04N 19/117* (2014.01)
*H04N 19/132* (2014.01)
(Continued)

(52) U.S. Cl.
CPC ......... *H04N 19/117* (2014.11); *H04N 19/132* (2014.11); *H04N 19/159* (2014.11);
(Continued)

(58) Field of Classification Search
CPC .. H04N 19/117; H04N 19/132; H04N 19/159; H04N 19/167; H04N 19/176; H04N 19/186; H04N 19/593
(Continued)

(56) References Cited

U.S. PATENT DOCUMENTS 10,368,094 B2 7/2019 Budagavi
10,477,205 B1 * 11/2019 Sim ...................... H04N 19/115
(Continued)

FOREIGN PATENT DOCUMENTS

CN 110100436 A 8/2019
KR 10-2017-0129750 A 11/2017
(Continued)

OTHER PUBLICATIONS

Benjamin Bross et al., "Versatile Video Coding (Draft 6)", Document: JVET-O2001-vE, Joint Video Experts Team (JVET) of ITU-T SG 16 WP 3 and ISO/IEC JTC 1/SC 29/WG 11, 15th Meeting: Gothenburg, SE, Jul. 3-12, 2019.
(Continued)

*Primary Examiner* — Allen C Wong
(74) *Attorney, Agent, or Firm* — IP Legal Services, LLC

(57) ABSTRACT

An image decoding method according to the disclosure comprises the steps of: determining whether a cross-component linear model (CCLM) mode is applied to a chroma block; acquiring a filtered neighboring luma sample with respect to a neighboring chroma sample adjacent to the chroma block, when it is determined that the CCLM mode is applied to the chroma block; deriving a CCLM parameter by using the neighboring chroma sample and the filtered neighboring luma sample; and generating a prediction block for the chroma block by using the CCLM parameter.

6 Claims, 13 Drawing Sheets

(51) Int. Cl.
*H04N 19/159* (2014.01)
*H04N 19/167* (2014.01)
*H04N 19/176* (2014.01)
*H04N 19/186* (2014.01)
*H04N 19/593* (2014.01)

(52) U.S. Cl.
CPC ......... *H04N 19/167* (2014.11); *H04N 19/176* (2014.11); *H04N 19/186* (2014.11); *H04N 19/593* (2014.11)

(58) Field of Classification Search
USPC ..................................................... 375/240.12
See application file for complete search history.

(56) References Cited

U.S. PATENT DOCUMENTS

2004/0076237 A1 4/2004 Kadono et al.
2012/0287995 A1 11/2012 Budagavi
2012/0328013 A1 12/2012 Budagavi et al.
2012/0328029 A1 12/2012 Sadafale
2016/0198190 A1 7/2016 Budagavi
2016/0277762 A1 9/2016 Zhang et al.
2017/0295365 A1 10/2017 Budagavi et al.
2018/0205946 A1 7/2018 Zhang et al.
2018/0220138 A1 8/2018 He et al.
2019/0289324 A1 9/2019 Budagavi
2020/0195970 A1* 6/2020 Ikai ...................... H04N 19/146
2020/0221079 A1 7/2020 Budagavi et al.
2020/0288135 A1 9/2020 Laroche et al.
2020/0296380 A1 9/2020 Aono et al.
2020/0382769 A1* 12/2020 Zhang .................. H04N 19/593
2021/0136360 A1 5/2021 Budagavi et al.
2021/0144406 A1 5/2021 Ikai et al.
2021/0176478 A1 6/2021 Na et al.
2021/0218962 A1 7/2021 Lim et al.
2021/0274187 A1 9/2021 Aono et al.
2021/0329261 A1* 10/2021 Ma ....................... H04N 19/159
2022/0094985 A1 3/2022 Ikai et al.
2022/0295058 A1 9/2022 Lim et al.
2022/0329831 A1 10/2022 He et al.
2023/0300377 A1 9/2023 Ikai et al.
2024/0137507 A1 4/2024 Lim et al.

FOREIGN PATENT DOCUMENTS

KR 10-2018-0039052 A 4/2018
KR 10-2019-0083956 A 7/2019
WO 2017/007989 A1 1/2017
WO 2018/199001 A1 11/2018
WO 2019/054300 A1 3/2019
WO 2019/072595 A1 4/2019
WO 2019/107994 A1 6/2019
WO 2019/131349 A1 7/2019
WO 2019/135636 A1 7/2019

OTHER PUBLICATIONS

Zhou Yun et al., “Study on the Development of Video Coding Standard VVC”, Radio & TV Broadcast Engineering, 2018, pp. 26-31, vol. 45, No. 9.

China National Intellectual Property Administration, Office Action of corresponding CN Patent Application No. 202080061291.9, May 9, 2024.

China National Intellectual Property Administration, Notice of Allowance of corresponding CN Patent Application No. 202080061291.9, Sep. 16, 2024.

Dae-Yeon Kim et al., “CE3-related: Simplification on CCLM process”, Document: JVET-00343, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-9.

* cited by examiner

| A | B | B | B |
|---|---|---|---|
| C | D | D | D |
| C | D | D | D |
| C | D | D | D |

Chroma block

| A | B | B | B |
|---|---|---|---|
| C | D | D | D |
| C | D | D | D |
| C | D | D | D |

Chroma block

| A | B | B | B |
|---|---|---|---|
| C | D | D | D |
| C | D | D | D |
| C | D | D | D |

Chroma block

LM mode LM-A mode LM-L mode

FIG. 14

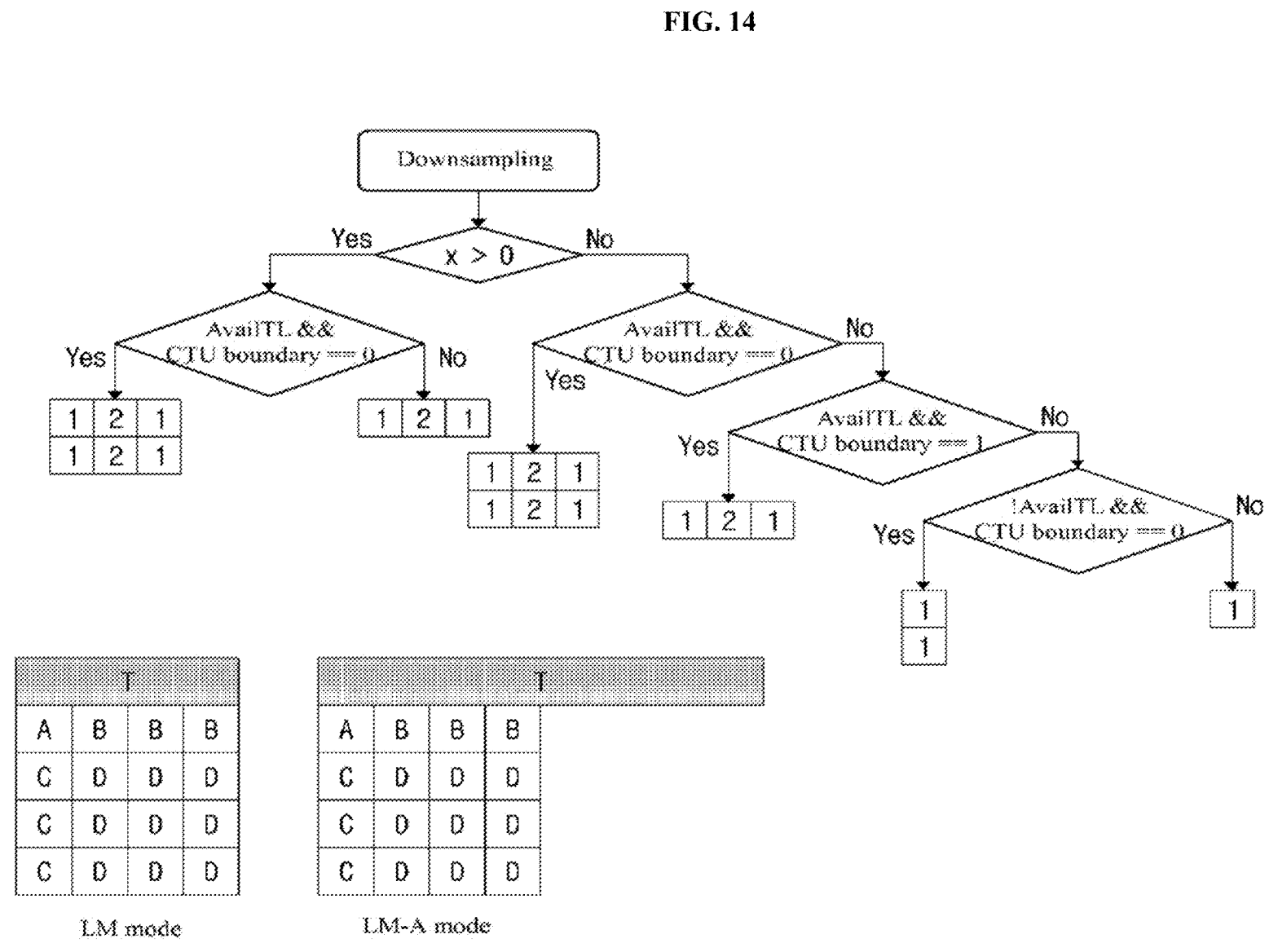

Downsampling
x > 0
Yes
No
AvailTL && CTU boundary == 0
AvailTL && CTU boundary == 0
AvailTL && CTU boundary == 1
!AvailTL && CTU boundary == 0
Yes
No
Yes
No
Yes
No
Yes
No T
LM mode T
LM-A mode

| T | | | |
|---|---|---|---|
| A | B | B | B |
| C | D | D | D |
| C | D | D | D |
| C | D | D | D |

LM mode

| T | | | | | | | |
|---|---|---|---|---|---|---|---|
| A | B | B | B | | | | |
| C | D | D | D | | | | |
| C | D | D | D | | | | |
| C | D | D | D | | | | |

LM-A mode

| L | A | B | B | B |
|---|---|---|---|---|
| | C | D | D | D |
| | C | D | D | D |
| | C | D | D | D |

LM mode

| L | A | B | B | B |
|---|---|---|---|---|
| | C | D | D | D |
| | C | D | D | D |
| | C | D | D | D |

LM-L mode

VIDEO SIGNAL PROCESSING METHOD AND DEVICE

CROSS REFERENCE TO RELATED APPLICATIONS

This application is a Continuation of U.S. patent application Ser. No. 17/636,966 (filed on Feb. 21, 2022), which is a National Stage Patent Application of PCT International Patent Application No. PCT/KR2020/011547 (filed on Aug. 28, 2020) under 35 U.S.C. § 371, which claims priority to Korean Patent Application No. 10-2019-0106040 (filed on Aug. 28, 2019), the teachings of which are incorporated herein in their entireties by reference.

FIELD OF THE DISCLOSURE

The present disclosure relates to a method and a device for processing a video signal.

DESCRIPTION OF THE RELATED ART

Recently, demands for high-resolution and high-quality images such as HD (High Definition) images and UHD (Ultra High Definition) images have increased in a variety of application fields. As image data becomes high-resolution and high-quality, the volume of data relatively increases compared to the existing image data, so when image data is transmitted by using media such as the existing wire and wireless broadband circuit or is stored by using the existing storage medium, expenses for transmission and expenses for storage increase. High efficiency image compression technologies may be utilized to resolve these problems which are generated as image data becomes high-resolution and high-quality.

There are various technologies such as an inter prediction technology which predicts a pixel value included in a current picture from a previous or subsequent picture of a current picture with an image impression technology, an intra prediction technology which predicts a pixel value included in a current picture by using pixel information in a current picture, an entropy encoding technology which assigns a short sign to a value with high appearance frequency and assigns a long sign to a value with low appearance frequency and so on, and image data may be effectively compressed and transmitted or stored by using these image compression technologies.

On the other hand, as demands for a high-resolution image have increased, demands for stereo-scopic image contents have increased as a new image service. A video compression technology for effectively providing high-resolution and ultra high-resolution stereo-scopic image contents has been discussed.

DISCLOSURE

Technical Purpose

A purpose of the present disclosure is to provide an intra prediction method and device in encoding/decoding a video signal.

A purpose of the present disclosure is to provide a method and a device of predicting a chroma component by using a luma component reconstructed sample in encoding/decoding a video signal.

Technical effects of the present disclosure may be non-limited by the above-mentioned technical effects, and other unmentioned technical effects may be clearly understood from the following description by those having ordinary skill in the technical field to which the present disclosure pertains.

Technical Solution

A video signal decoding method according to the present disclosure includes determining whether a CCLM (Cross-component Linear Model) mode is applied to a chroma block, obtaining a filtered neighboring luma sample for a neighboring chroma sample adjacent to the chroma block when it is determined that a CCLM mode is determined for the chroma block, deriving a CCLM parameter by using the neighboring chroma sample and the filtered neighboring luma sample and generating a prediction block for the chroma block by using the CCLM parameter.

A video signal encoding method according to the present disclosure includes determining whether a CCLM (Cross-component Linear Model) mode is applied to a chroma block, obtaining a filtered neighboring luma sample for a neighboring chroma sample adjacent to the chroma block when it is determined that a CCLM mode is determined for the chroma block, deriving a CCLM parameter by using the neighboring chroma sample and the filtered neighboring luma sample and generating a prediction block for the chroma block by using the CCLM parameter.

In a video signal decoding method according to the present disclosure, the filtered neighboring luma sample may be generated by applying a downsampling filter to a co-located luma sample corresponding to the neighboring chroma sample and neighboring luma samples adjacent to the co-located luma sample.

In a video signal decoding method according to the present disclosure, when at least one of the co-located luma sample and the neighboring luma samples is unavailable, a reconstructed sample positioned on a boundary in a luma block may be padded to a position of an unavailable sample.

In a video signal decoding method according to the present disclosure, a type of the downsampling filter may be determined based on a type of a current image.

In a video signal decoding method according to the present disclosure, a type of the downsampling filter may be determined based on a position of the neighboring chroma sample.

In a video signal decoding method according to the present disclosure, the neighboring chroma sample may be extracted by subsampling a plurality of neighboring chroma samples neighboring the chroma block.

In a video signal decoding method according to the present disclosure, a subsampling rate may be determined based on at least one of a size or a shape of the chroma block.

It is to be understood that the foregoing summarized features are exemplary aspects of the following detailed description of the present disclosure without limiting the scope of the present disclosure.

Technical Effect

According to the present disclosure, encoding/decoding efficiency may be improved by predicting a chroma sample by using a luma reconstructed sample.

According to the present disclosure, encoding/decoding efficiency of a CCLM mode may be improved by determining a downsampling filter type regardless of availability of a neighboring sample.

According to the present disclosure, encoding/decoding efficiency of a CCLM mode may be improved by subsampling neighboring samples to derive a CCLM parameter.

Effects obtainable from the present disclosure may be non-limited by the above-mentioned effect, and other unmentioned effects may be clearly understood from the following description by those having ordinary skill in the technical field to which the present disclosure pertains.

BRIEF DESCRIPTION OF THE DRAWINGS

FIG. 8 is a flow diagram showing a method of deriving a prediction sample of a chroma component according to an embodiment of the present disclosure.

FIG. 14 illustrates a downsampling filter type applied to a co-located luma sample of a top neighboring sample when a current image is not a HDR image.

DETAILED DESCRIPTION OF THE DISCLOSURE

As the present disclosure may make various changes and have several embodiments, specific embodiments will be illustrated in a drawing and described in detail. But, it is not intended to limit the present disclosure to a specific embodiment, and it should be understood that it includes all changes, equivalents or substitutes included in an idea and a technical scope for the present disclosure. A similar reference sign is used for a similar component while describing each drawing.

A term such as first, second, etc. may be used to describe various components, but the components should not be limited by the terms. The terms are used only to distinguish one component from other components. For example, without going beyond a scope of a right of the present disclosure, a first component may be referred to as a second component and similarly, a second component may be also referred to as a first component. A term, and/or, includes a combination of a plurality of relative entered items or any item of a plurality of relative entered items.

When a component is referred to as being "linked" or "connected" to other component, it should be understood that it may be directly linked or connected to other component, but other component may exist in the middle. On the other hand, when a component is referred to as being "directly linked" or "directly connected" to other component, it should be understood that other component does not exist in the middle.

As terms used in this application are only used to describe a specific embodiment, they are not intended to limit the present disclosure. Expression of the singular includes expression of the plural unless it clearly has a different meaning contextually. In this application, it should be understood that a term such as "include" or "have", etc. is to designate the existence of characteristics, numbers, stages, motions, components, parts or their combinations entered in a specification, but is not to exclude the existence or possibility of addition of one or more other characteristics, numbers, stages, motions, components, parts or their combinations in advance.

Hereinafter, referring to the attached drawings, a desirable embodiment of the present disclosure will be described in more detail. Hereinafter, the same reference sign is used for the same component in a drawing and an overlapping description for the same component is omitted.

Figure 1:
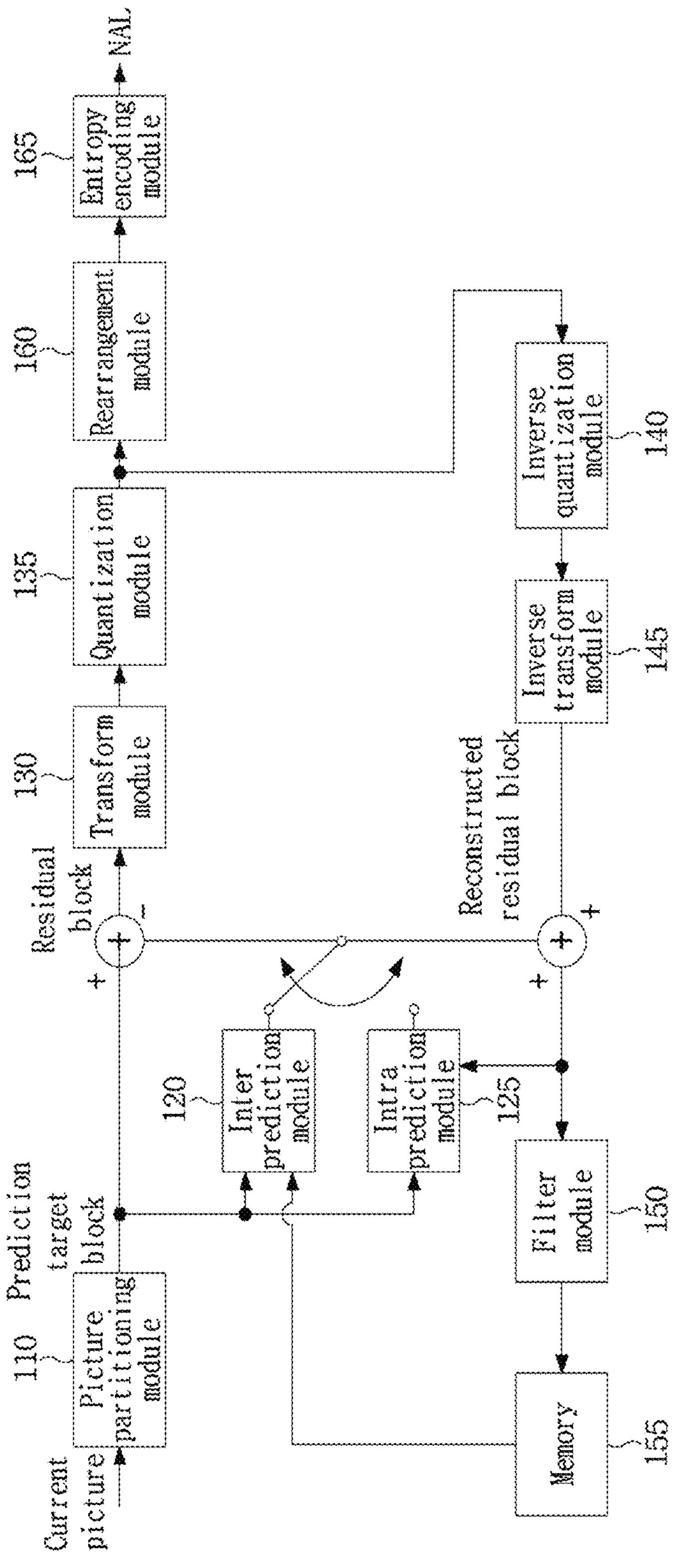
FIG. 1 is a block diagram showing an image encoding device according to an embodiment of the present disclosure.

FIG. 1 is a block diagram showing an image encoding device according to an embodiment of the present disclosure.

Referring to FIG. 1, an image encoding device 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

As each construction unit in FIG. 1 is independently shown to show different characteristic functions in an image encoding device, it does not mean that each construction unit is constituted by separated hardware or one software unit. That is, as each construction unit is included by being enumerated as each construction unit for convenience of a description, at least two construction units of each construction unit may be combined to constitute one construction unit or one construction unit may be partitioned into a plurality of construction units to perform a function, and even an integrated embodiment and a separated embodiment of each construction unit are also included in a scope of a right of the present disclosure unless they are departing from essence of the present disclosure.

Further, some components may be just an optional component for improving performance, not a necessary component which perform an essential function in the present disclosure. The present disclosure may be implemented by including only a construction unit necessary for implementing essence of the present disclosure excluding a component used to just improve performance, and a structure including only a necessary component excluding an optional component used to just improve performance is also included in a scope of a right of the present disclosure.

A picture partitioning unit 110 may partition an input picture into at least one processing unit. In this connection, a processing unit may be a prediction unit (PU), a transform unit (TU), or a coding unit (CU). In a picture partitioning unit 110, one picture may be partitioned into a combination of a plurality of coding units, prediction units and transform units and a picture may be encoded by selecting a combination of one coding unit, prediction unit and transform unit according to a predetermined standard (for example, cost function).

For example, one picture may be partitioned into a plurality of coding units. In order to partition a coding unit in a picture, a recursive tree structure such as a quad tree structure may be used, and a coding unit which is partitioned into other coding units by using one image or the largest coding unit as a route may be partitioned with as many child nodes as the number of partitioned coding units. A coding unit which is no longer partitioned according to a certain restriction becomes a leaf node. In other words, when it is assumed that only square partitioning is possible for one coding unit, one coding unit may be partitioned into up to four other coding units.

Hereinafter, in an embodiment of the present disclosure, a coding unit may be used as a unit for encoding or may be used as a unit for decoding.

A prediction unit may be partitioned with at least one square or rectangular shape, etc. in the same size in one coding unit or may be partitioned so that any one prediction unit of prediction units partitioned in one coding unit can have a shape and/or a size different from another prediction unit.

In generating a prediction unit performing intra prediction based on a coding block, when it is not the smallest coding unit, intra prediction may be performed without performing partitioning into a plurality of prediction units, N×N.

Prediction units 120 and 125 may include an inter prediction unit 120 performing inter prediction and an intra prediction unit 125 performing intra prediction. Whether to perform inter prediction or intra prediction for a prediction unit may be determined and detailed information according to each prediction method (for example, an intra prediction mode, a motion vector, a reference picture, etc.) may be determined. In this connection, a processing unit that prediction is performed may be different from a processing unit that a prediction method and details are determined. For example, a prediction method, a prediction mode, etc. may be determined in a prediction unit and prediction may be performed in a transform unit. A residual value (a residual block) between a generated prediction block and an original block may be input to a transform unit 130. In addition, prediction mode information used for prediction, motion vector information, etc. may be encoded with a residual value in an entropy encoding unit 165 and may be transmitted to a decoding device. When a specific encoding mode is used, an original block may be encoded as it is and transmitted to a decoding unit without generating a prediction block through prediction units 120 or 125.

An inter prediction unit 120 may predict a prediction unit based on information on at least one picture of a previous picture or a subsequent picture of a current picture, or in some cases, may predict a prediction unit based on information on some encoded regions in a current picture. An inter prediction unit 120 may include a reference picture interpolation unit, a motion prediction unit and a motion compensation unit.

A reference picture interpolation unit may receive reference picture information from a memory 155 and generate pixel information equal to or less than an integer pixel in a reference picture. For a luma pixel, an 8-tap DCT-based interpolation filter having a different filter coefficient may be used to generate pixel information equal to or less than an integer pixel in a ¼ pixel unit. For a chroma signal, a 4-tap DCT-based interpolation filter having a different filter coefficient may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS (New Three-Step Search Algorithm), etc. may be used. A motion vector may have a motion vector value in a unit of a ½ or ¼ pixel based on an interpolated pixel. A motion prediction unit may predict a current prediction unit by varying a motion prediction method. As A motion prediction method, various methods such as a skip method, a merge method, an advanced motion vector prediction (AMVP) method, an intra block copy method, etc. may be used.

An intra prediction unit 125 may generate a prediction unit based on reference pixel information around a current block, which is pixel information in a current picture. When a neighboring block in a current prediction unit is a block which performed inter prediction and thus, a reference pixel is a pixel which performed inter prediction, a reference pixel included in a block which performed inter prediction may be used by being replaced with reference pixel information of a surrounding block which performed intra prediction. In other words, when a reference pixel is unavailable, unavailable reference pixel information may be used by being replaced with at least one reference pixel of available reference pixels.

A prediction mode in intra prediction may have a directional prediction mode using reference pixel information according to a prediction direction and a non-directional mode not using directional information when performing prediction. A mode for predicting luma information may be different from a mode for predicting chroma information and intra prediction mode information used for predicting luma information or predicted luma signal information may be utilized to predict chroma information.

When a size of a prediction unit is the same as that of a transform unit in performing intra prediction, intra prediction for a prediction unit may be performed based on a pixel at a left position of a prediction unit, a pixel at a top-left position and a pixel at a top position. However, when a size of a prediction unit is different from that of a transform unit in performing intra prediction, intra prediction may be performed by using a reference pixel based on a transform unit. In addition, intra prediction using N×N partitioning may be used only for the smallest coding unit.

In an intra prediction method, a prediction block may be generated after applying an adaptive intra smoothing (AIS) filter to a reference pixel according to a prediction mode. A type of an AIS filter applied to a reference pixel may be different. In order to perform an intra prediction method, an intra prediction mode in a current prediction unit may be predicted from an intra prediction mode in a prediction unit around a current prediction unit. When a prediction mode in a current prediction unit is predicted by using mode information predicted from a surrounding prediction unit, information that a prediction mode in a current prediction unit is the same as a prediction mode in a surrounding prediction unit may be transmitted by using predetermined flag information if an intra prediction mode in a current prediction unit is the same as an intra prediction mode in a surrounding prediction unit and prediction mode information of a current block may be encoded by performing entropy encoding if a prediction mode in a current prediction unit is different from a prediction mode in a surrounding prediction unit.

In addition, a residual block may be generated which includes information on a residual value that is a difference value between a prediction unit which performed prediction based on a prediction unit generated in prediction units 120 and 125 and an original block in a prediction unit. A generated residual block may be input to a transform unit 130.

A transform unit 130 may transform an original block and a residual block which includes residual value information in a prediction unit generated through prediction units 120 and 125 by using a transform method such as DCT (Discrete Cosine Transform), DST (Discrete Sine Transform), KLT. Whether to apply DCT, DST or KLT to transform a residual block may be determined based on an intra prediction mode information in a prediction unit which is used to generate a residual block.

A quantization unit 135 may quantize values transformed into a frequency domain in a transform unit 130. A quantization coefficient may be changed according to a block or importance of an image. A value calculated in a quantization unit 135 may be provided to a dequantization unit 140 and a rearrangement unit 160.

A rearrangement unit 160 may perform rearrangement on coefficient values for a quantized residual value.

A rearrangement unit 160 may change a coefficient in a shape of a two-dimensional block into a shape of a one-dimensional vector through a coefficient scanning method. For example, a rearrangement unit 160 may scan from a DC coefficient to a coefficient in a high frequency domain by using a zig-zag scanning method and change it into a shape of a one-dimensional vector. According to a size of a transform unit and an intra prediction mode, instead of zig-zag scanning, vertical scanning where a coefficient in a shape of a two-dimensional block is scanned in a column direction or horizontal scanning where a coefficient in a shape of a two-dimensional block is scanned in a row direction may be used. In other words, which scanning method among zig-zag scanning, vertical directional scanning and horizontal directional scanning will be used may be determined according to a size of a transform unit and an intra prediction mode.

An entropy encoding unit 165 may perform entropy encoding based on values calculated by a rearrangement unit 160. Entropy encoding may use various encoding methods such as exponential Golomb, CAVLC (Context-Adaptive Variable Length Coding), CABAC (Context-Adaptive Binary Arithmetic Coding).

An entropy encoding unit 165 may encode a variety of information such as residual value coefficient information in a coding unit and block type information, prediction mode information, partitioning unit information, prediction unit information and transmission unit information, motion vector information, reference frame information, block interpolation information, filtering information, etc. from a rearrangement unit 160 and prediction units 120 and 125.

An entropy encoding unit 165 may perform entropy encoding for a coefficient value in a coding unit which is input from a rearrangement unit 160.

A dequantization unit 140 and an inverse transform unit 145 perform dequantization for values quantized in a quantization unit 135 and perform inverse transform on values transformed in a transform unit 130. A residual value generated by a dequantization unit 140 and an inverse transform unit 145 may be combined with a prediction unit predicted by a motion prediction unit, a motion compensation unit and an intra prediction unit included in prediction units 120 and 125 to generate a reconstructed block.

A filter unit 150 may include at least one of a deblocking filter, an offset correction unit and an adaptive loop filter (ALF).

A deblocking filter may remove block distortion which is generated by a boundary between blocks in a reconstructed picture. In order to determine whether deblocking is performed, whether a deblocking filter is applied to a current block may be determined based on a pixel included in several rows or columns included in a block. When a deblocking filter is applied to a block, a strong filter or a weak filter may be applied according to required deblocking filtering strength. In addition, in applying a deblocking filter, when horizontal filtering and vertical filtering are performed, horizontal directional filtering and vertical directional filtering may be set to be processed in parallel.

An offset correction unit may correct an offset with an original image in a unit of a pixel for an image that deblocking was performed. In order to perform offset correction for a specific picture, a region where an offset will be performed may be determined after dividing a pixel included in an image into the certain number of regions and a method in which an offset is applied to a corresponding region or a method in which an offset is applied by considering edge information of each pixel may be used.

Adaptive loop filtering (ALF) may be performed based on a value obtained by comparing a filtered reconstructed image with an original image. After a pixel included in an image is divided into predetermined groups, filtering may be discriminately performed per group by determining one filter which will be applied to a corresponding group. Information related to whether ALF will be applied may be transmitted per coding unit (CU) for a luma signal and a shape and a filter coefficient of an ALF filter to be applied may vary according to each block. In addition, an ALF filter in the same shape (fixed shape) may be applied regardless of a feature of a block to be applied.

A memory 155 may store a reconstructed block or picture calculated through a filter unit 150 and a stored reconstructed block or picture may be provided to prediction units 120 and 125 when performing inter prediction.

Figure 2:
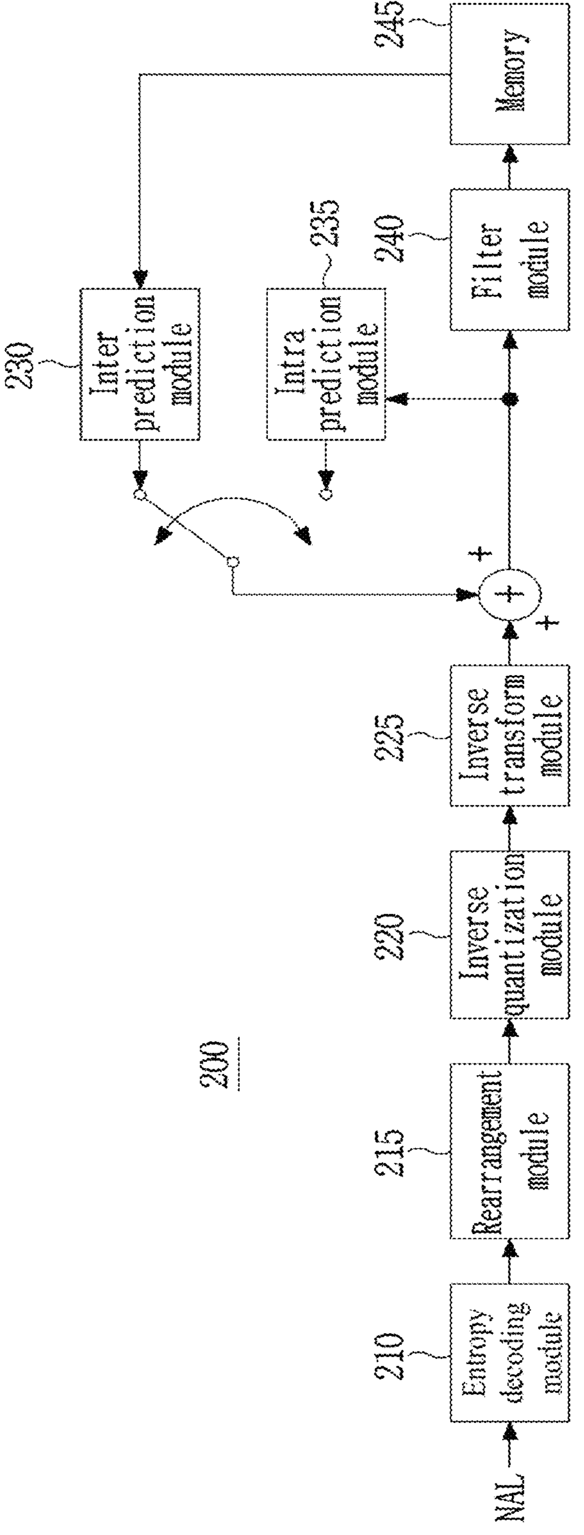
FIG. 2 is a block diagram showing an image decoding device according to an embodiment of the present disclosure.

FIG. 2 is a block diagram showing an image decoding device according to an embodiment of the present disclosure.

Referring to FIG. 2, an image decoding device 200 may include an entropy decoding unit 210, a rearrangement unit 215, a dequantization unit 220, an inverse transform unit 225, prediction units 230 and 235, a filter unit 240, and a memory 245.

When an image bitstream is input from an image encoding device, an input bitstream may be decoded according to a procedure opposite to an image encoding device.

An entropy decoding unit 210 may perform entropy decoding according to a procedure opposite to a procedure in which entropy encoding is performed in an entropy encoding unit of an image encoding device. For example, in response to a method performed in an image encoding device, various methods such as Exponential Golomb, CAVLC (Context-Adaptive Variable Length Coding), CABAC (Context-Adaptive Binary Arithmetic Coding) may be applied.

An entropy decoding unit 210 may decode information related to intra prediction and inter prediction performed in an encoding device.

A rearrangement unit 215 may perform rearrangement based on a method that a bitstream entropy-decoded in an entropy decoding unit 210 is rearranged in an encoding unit. Coefficients represented in a form of a one-dimensional vector may be rearranged by being reconstructed into coefficients in a form of a two-dimensional block. A rearrangement unit 215 may receive information related to coefficient scanning performed in an encoding unit and perform rearrangement through a method in which scanning is inversely performed based on a scanning order performed in a corresponding encoding unit.

A dequantization unit 220 may perform dequantization based on a quantization parameter provided from an encoding device and a coefficient value of a rearranged block.

An inverse transform unit 225 may perform transform performed in a transform unit, i.e., inverse transform for DCT, DST, and KLT, i.e., inverse DCT, inverse DST and inverse KLT for a result of quantization performed in an image encoding device. Inverse transform may be performed based on a transmission unit determined in an image encoding device. In an inverse transform unit 225 of an image decoding device, a transform technique (for example, DCT, DST, KLT) may be selectively performed according to a plurality of information such as a prediction method, a size of a current block, a prediction direction, etc.

Prediction units 230 and 235 may generate a prediction block based on information related to generation of a prediction block provided from an entropy decoding unit 210 and pre-decoded block or picture information provided from a memory 245.

As described above, when a size of a prediction unit is the same as a size of a transform unit in performing intra prediction in the same manner as an operation in an image encoding device, intra prediction for a prediction unit may be performed based on a pixel at a left position of a prediction unit, a pixel at a top-left position and a pixel at a top position, but when a size of a prediction unit is different from a size of a transform unit in performing intra prediction, intra prediction may be performed by using a reference pixel based on a transform unit. In addition, intra prediction using N×N partitioning may be used only for the smallest coding unit.

Prediction units 230 and 235 may include a prediction unit determination unit, an inter prediction unit and an intra prediction unit. A prediction unit determination unit may receive a variety of information such as prediction unit information, prediction mode information of an intra prediction method, motion prediction-related information of an inter prediction method, etc. which are input from an entropy decoding unit 210, divide a prediction unit in a current coding unit and determine whether a prediction unit performs inter prediction or intra prediction. An inter prediction unit 230 may perform inter prediction for a current prediction unit based on information included in at least one picture of a previous picture or a subsequent picture of a current picture including a current prediction unit by using information necessary for inter prediction in a current prediction unit provided from an image encoding device. Alternatively, inter prediction may be performed based on information on some regions which are pre-reconstructed in a current picture including a current prediction unit.

In order to perform inter prediction, whether a motion prediction method in a prediction unit included in a corresponding coding unit is a skip mode, a merge mode, an AMVP mode, or an intra block copy mode may be determined based on a coding unit.

An intra prediction unit 235 may generate a prediction block based on pixel information in a current picture. When a prediction unit is a prediction unit which performed intra prediction, intra prediction may be performed based on intra prediction mode information in a prediction unit provided from an image encoding device. An intra prediction unit 235 may include an adaptive intra smoothing (AIS) filter, a reference pixel interpolation unit and a DC filter. As a part performing filtering on a reference pixel of a current block, an AIS filter may be applied by determining whether a filter is applied according to a prediction mode in a current prediction unit. AIS filtering may be performed for a reference pixel of a current block by using AIS filter information and a prediction mode in a prediction unit provided from an image encoding device. When a prediction mode of a current block is a mode which does not perform AIS filtering, an AIS filter may not be applied.

When a prediction mode in a prediction unit is a prediction unit which performs intra prediction based on a pixel value which interpolated a reference pixel, a reference pixel interpolation unit may interpolate a reference pixel to generate a reference pixel in a unit of a pixel equal to or less than an integer value. When a prediction mode in a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset correction unit and ALF.

Information on whether a deblocking filter was applied to a corresponding block or picture and information on whether a strong filter or a weak filter was applied when a deblocking filter was applied may be provided from an image encoding device. Information related to a deblocking filter provided from an image encoding device may be provided in a deblocking filter of an image decoding device and deblocking filtering for a corresponding block may be performed in an image decoding device.

An offset correction unit may perform offset correction on a reconstructed image based on offset value information, a type of offset correction applied to an image when performing encoding.

ALF may be applied to a coding unit based on information on whether ALF is applied, ALF coefficient information, etc. provided from an encoding device. Such ALF information may be provided by being included in a specific parameter set.

A memory 245 may store a reconstructed picture or block for use as a reference picture or a reference block and provide a reconstructed picture to an output unit.

As described above, hereinafter, in an embodiment of the present disclosure, a coding unit is used as a term of a coding unit for convenience of a description, but it may be a unit which performs decoding as well as encoding.

In addition, as a current block represents a block to be encoded/decoded, it may represent a coding tree block (or a coding tree unit), a coding block (or a coding unit), a transform block (or a transform unit) or a prediction block (or a prediction unit), etc. according to an encoding/decoding step. In this specification, 'a unit' may represent a base unit for performing a specific encoding/decoding process and 'a block' may represent a pixel array in a predetermined size. Unless otherwise classified, 'a block' and 'a unit' may be used interchangeably. For example, in the after-described embodiment, it may be understood that a coding block (a coding block) and a coding unit (a coding unit) are used interchangeably.

Figure 3:
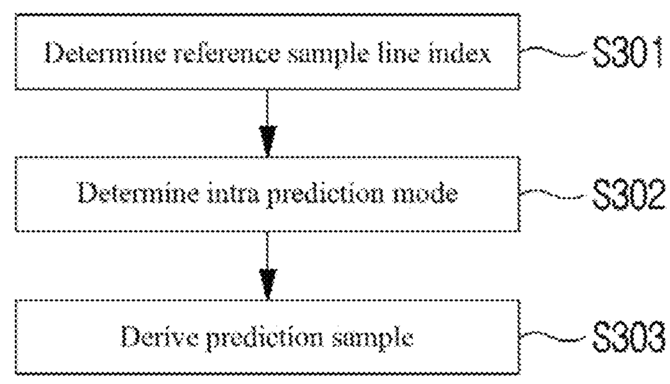
FIG. 3 is a flow diagram showing an intra prediction method according to an embodiment of the present disclosure.

FIG. 3 is a flow diagram showing an intra prediction method according to an embodiment of the present disclosure.

In reference to FIG. 3, an index of a reference sample line of a current block may be determined S301. The index may specify one of a plurality of reference sample line candidates. A plurality of reference sample line candidates may include an adjacent reference sample line adjacent to a current block and at least one non-adjacent reference sample line which is not adjacent to a current block.

In an example, an adjacent reference sample line composed of an adjacent row whose y-axis coordinate is smaller by 1 than an uppermost row of a current block and an adjacent column whose x-axis coordinate is smaller by 1 than a leftmost column of a current block may be used as a reference sample line candidate.

A first non-adjacent reference sample line including a non-adjacent row whose y-axis coordinate is smaller by 2 than an uppermost row of a current block and a non-adjacent column whose x-axis coordinate is smaller by 2 than a leftmost column of a current block may be used as a reference sample line candidate.

A second non-adjacent reference sample line including a non-adjacent row whose y-axis coordinate is smaller by 3 than an uppermost row of a current block and a non-adjacent column whose x-axis coordinate is smaller by 3 than a leftmost column of a current block may be used as a reference sample line candidate.

The index may indicate one of an adjacent reference sample line, a first non-adjacent reference sample line or a second non-adjacent reference sample line. In an example, when an index is 0, it means an adjacent reference sample line is selected and when an index is 1, it means a first non-adjacent reference sample line is selected and when an index is 2, it means a second non-adjacent reference sample line is selected.

An index specifying one of a plurality of reference sample line candidates may be signaled in a bitstream.

Alternatively, an index may be signaled for a luma component block and signaling of an index may be omitted for a chroma component block. When signaling of an index is omitted, an index may be considered 0. In other words, for a chroma component block, intra prediction may be performed by using an adjacent reference sample line.

Reconstructed samples included by a selected reference sample line may be derived as reference samples.

Next, an intra prediction mode of a current block may be determined S302.

Figure 4:
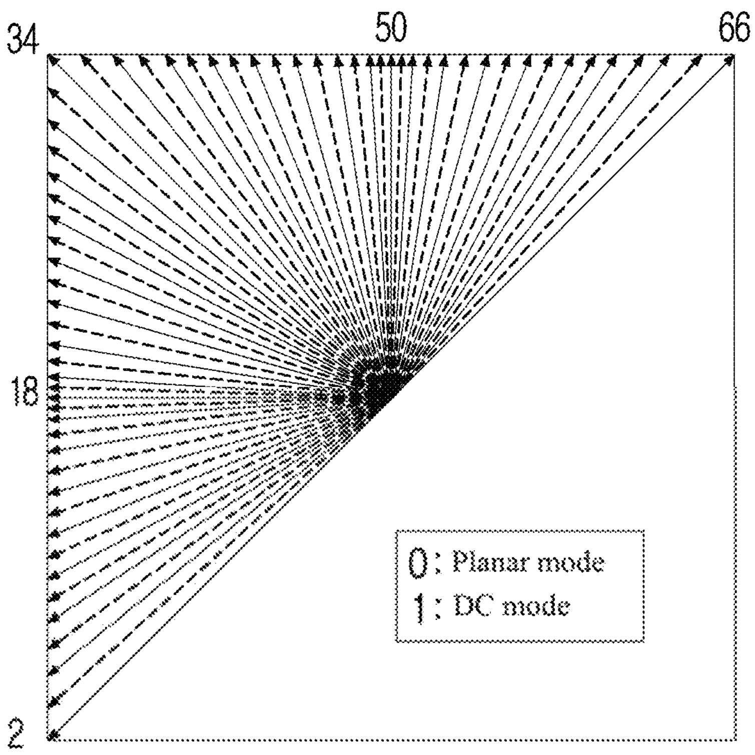
FIG. 4 illustrates a type of intra prediction modes.

FIG. 4 illustrates a type of intra prediction modes. As in an example shown in FIG. 4, intra prediction modes include a nondirectional prediction mode (DC and Planar) and a directional prediction mode. FIG. 4 illustrated that 65 directional prediction modes are defined.

A flag representing whether an intra prediction mode of a current block is the same as a MPM (Most Probable Mode) may be signaled in a bitstream. In an example, when a value of a MPM flag is 1, it represents that there is the same MPM as an intra prediction mode of a current block. On other hand, when a value of a MPM flag is 0, it represents that there is no same MPM as an intra prediction mode of a current block.

When a value of a MPM flag is 1, a flag representing whether an intra prediction mode of a current block is the same as a default intra prediction mode may be signaled. A default intra prediction mode may be at least one of a DC, a Planar, a vertical directional prediction mode or a horizontal directional prediction mode. In an example, intra_not_planar_flag, a flag representing whether an intra prediction mode of a current block is a planar mode, may be signaled. When a value of the flag, intra_not_planar_flag, is 0, it represents that an intra prediction mode of a current block is planar. On the other hand, when a value of the flag, intra_not_planar_flag, is 1, it represents that an intra prediction mode of a current block is not planar. When a value of the flag, intra_not_planar_flag, is 1, an index specifying one of MPM candidates may be signaled. An intra prediction mode of a current block may be set to be the same as a MPM indicated by a MPM index.

Based on an intra prediction mode and reference samples belonging to a reference sample line, a prediction sample may be derived S303.

When an intra prediction mode of a current block is a directional prediction mode, a prediction sample may be derived by using a reference sample positioned on a line which follows an angle of a directional prediction mode.

When an intra prediction mode of a current block is a planar mode, a prediction sample may be derived by using a reference sample in a vertical direction of a prediction target sample and a reference sample in a horizontal direction.

Figure 5:
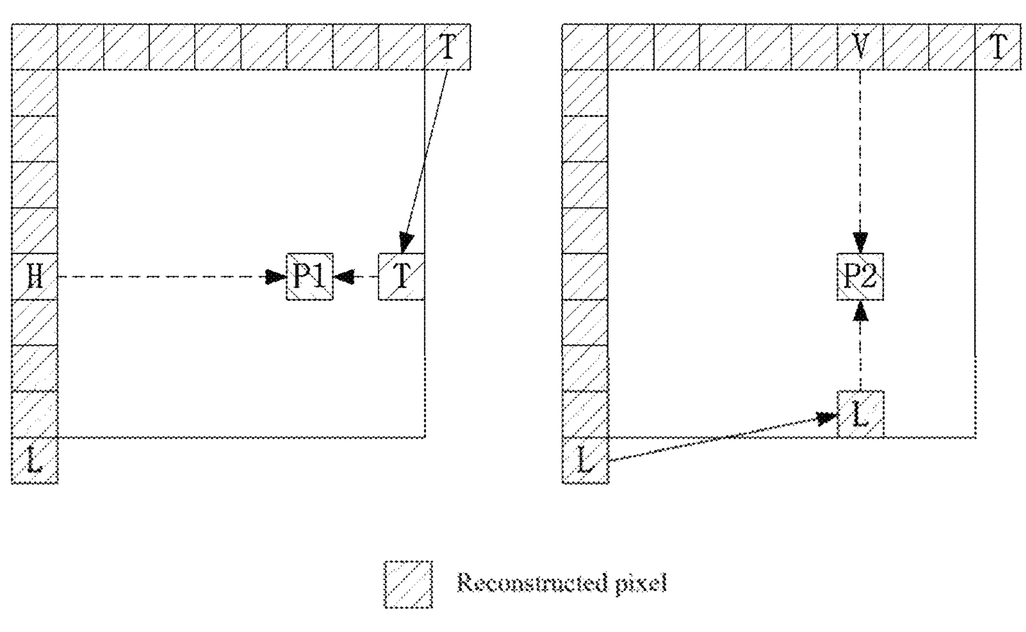
FIG. 5 is a drawing for describing an example of deriving a prediction sample under a planar mode.

FIG. 5 is a drawing for describing an example of deriving a prediction sample under a planar mode.

In FIG. 5, T represents a reference sample adjacent to a top-right corner of a current block and L represents a reference sample adjacent to a bottom-left corner of a current block.

Under a planar mode, for a prediction target sample, horizontal directional prediction sample P1 and vertical directional prediction sample P2 may be derived.

Horizontal directional prediction sample P1 may be generated by performing linear interpolation for top-right reference sample T and reference sample H positioned on the same horizontal line as a prediction target sample.

Vertical directional prediction sample P2 may be generated by performing linear interpolation for bottom-left reference sample L and reference sample V positioned on the same vertical line as a prediction target sample.

Subsequently, based on a weighted sum operation of horizontal directional prediction sample P1 and vertical directional prediction sample P2, a prediction sample may be derived. Equation 1 represents an example in which prediction sample P is derived by a weighted sum operation of horizontal directional prediction sample P1 and vertical directional prediction sample P2.

$$P=(\alpha\times P1-\beta\times P2)/(\alpha+\beta) \quad \text{[Equation 1]}$$

In the Equation 1, a represents a weight applied to horizontal directional prediction sample P1 and β represents a weight applied to vertical directional prediction sample P2.

Weights α and β may be determined based on a size or a shape of a current block. Concretely, weights α and β may be determined by considering at least one of a width or a height of a current block. In an example, when a width and a height of a current block are the same, weights α and β may be set as the same value. When weights α and β are the same, a prediction sample may be derived as an average value of horizontal directional prediction sample P1 and vertical directional prediction sample P2. On the other hand, when a width and a height of a current block are different, weights α and β may be set differently. In an example, when a width of a current block is greater than a height, weight ß may be set as a value larger than weight α and when a height of a current block is greater than a width, weight α may be set as a value larger than weight β. Alternatively, conversely, when a width of a current block is greater than a height, weight α may be set as a value larger than weight β and when a height of a current block is greater than a width, weight β may be set as a value larger than weight α.

In another example, weights α and β may be derived from one of a plurality of weight set candidates. In an example, when (1, 1), (3, 1) and (1, 3), weight candidate sets representing a combination of weights α and β, are predefined, weights α and β may be selected to be the same as one of the weight candidate sets.

An index indicating one of a plurality of weight set candidates may be signaled in a bitstream. The index may be signaled at a block level. In an example, an index may be signaled in a unit of a coding block or a transform block.

Alternatively, an index may be signaled at a level of a coding tree unit, a slice, a picture or a sequence. Blocks included in an index transmission unit may determine weights α and β by referring to an index signaled at a higher level. In other words, for blocks included in an index transmission unit, weights α and β may be set to be the same.

In an example of FIG. 5, it was shown that top-right reference sample T is used to derive horizontal directional prediction sample P1 and bottom-left reference sample L is used to derive vertical directional prediction sample P2.

Horizontal directional prediction sample P1 may be derived by using a reference sample other than a top-right reference sample or vertical directional prediction sample P2 may be derived by using a reference sample other than a bottom-left reference sample. In an example, horizontal directional prediction sample P1 and vertical directional prediction sample P2 may be derived by configuring reference sample set candidates for a first reference sample used to derive horizontal directional prediction sample P1 and a second reference sample used to derive vertical directional prediction sample P2 and using one selected among a plurality of reference sample set candidates.

An index identifying one of a plurality of reference sample set candidates may be signaled in a bitstream. The index may be signaled in a unit of a block, a sub-block or a sample.

Alternatively, based on a position of a prediction target sample, a reference sample set candidate may be selected.

Figures 6, 7:
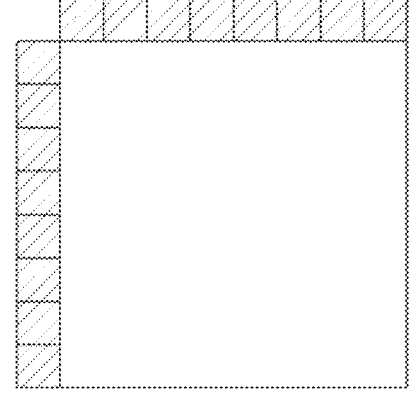
FIG. 6 illustrates a plurality of reference sample set candidates.
FIG. 7 is to describe a method of deriving a prediction sample under a DC mode.

FIG. 6 illustrates a plurality of reference sample set candidates.

In an example shown in FIG. 6, indication of (y, x) represents a combination of a y-coordinate and an x-coordinate of each sample. For example, (2, 1) represents a sample that a y-coordinate is 2 and an x-coordinate is 1.

In an example of FIG. 6, a first reference sample set candidate may be configured with reference sample T1 adjacent to a top-right corner of a current block and reference sample L1 adjacent to a top-left corner of a current block. When a position of a top-left sample of a current block is (0, 0), T1 represents a reference sample of a (−1, W) coordinate and L1 represents a reference sample of a (H,−1) coordinate. Here, W and H represent a width and a height of a current block, respectively.

A second reference sample set candidate may be configured with reference sample T2 adjacent to the top of T1 and reference sample L2 adjacent to the left of L1. In an example, T2 represents a reference sample of a (−2, W) coordinate and L2 represents a reference sample of a (H,−2) coordinate.

A third reference sample set candidate may be configured with reference sample T3 adjacent to the top of T2 and reference sample L3 adjacent to the left of L2. In an example, T3 represents a reference sample of a (−3, W) coordinate and L3 represents a reference sample of a (H,−3) coordinate.

A fourth reference sample set candidate may be configured with reference sample T4 adjacent to the top of T3 and reference sample LA adjacent to the left of L3. In an example, T4 represents a reference sample of a (−4, W) coordinate and LA represents a reference sample of a (H,−4) coordinate.

A reference sample set candidate is not limited to a shown example. In an example, in an example of FIG. 6, it was illustrated that a combination of a reference sample that an x-axis coordinate of a current block is W and a reference sample that a y-axis coordinate is H is set as a reference sample set candidate. But, contrary to a shown example, a reference sample that an x-axis coordinate is W/2 or (W/2)−1 or a reference sample that a y-axis coordinate is H/2 or (H/2)−1 may configure a reference sample set candidate.

According to at least one of a position or a size of a current block, a reference sample set may be adaptively selected. In an example, when a current block has a square shape that a width and a height are the same, a reference sample set configured with reference sample (−1, W) and reference sample (H,−1) may be used. When a current block has a non-square shape that a width is greater than a height, a reference sample set configured with reference sample (−1, W/2) and reference sample (H,−1) may be used. When a current block has a non-square shape that a height is greater than a width, a reference sample set configured with reference sample (−1, W) and reference sample (H/2,−1) may be used.

When an intra prediction mode of a current block is DC, a prediction sample may be derived based on an average value of reference samples.

FIG. 7 is to describe a method of deriving a prediction sample under a DC mode.

An average value of reference samples adjacent to a current block may be calculated and an average value calculated for all samples in a current block may be set as a prediction value.

An average value may be derived based on top reference samples adjacent to the top of a current block and left reference samples adjacent to the left of a current block.

Alternatively, according to a shape of a current block, an average value may be derived by using only top reference samples or left reference samples. In an example, when a current block is a square block, an average value may be derived by using top reference samples and left reference samples. When a width of a current block is greater than a height or when a ratio of a width and a height is equal to or greater than (or less than) a predefined value, an average value may be derived by using only top reference samples. When a height of a current block is greater than a width or when a ratio of a width and a height is equal to or greater than (or less than) a predefined value, an average value may be derived by using only left reference samples.

When deriving an average value, a specific reference sample may be excluded. In an example, when an average of reconstructed pixels is m and a standard deviation is σ, a reference sample not beyond a scope of k times a standard deviation from an average value may be used to calculate an average value and other reference samples may be excluded from the calculation of an average value. In this case, k is a natural number and may have a value of 1, 2, 3, 4, etc. A value of k may be predefined in an encoder and a decoder. Alternatively, a value of k may be determined based on at least one of a size or a shape of a block. Alternatively, information representing a value of k may be signaled in a bitstream.

Whether a reference sample is used may be determined by setting any threshold value, instead of standard deviation σ. In an example, a reference sample that an absolute value of difference with an average value is equal to or less than a threshold value may be set to be available when deriving an average value. On the other hand, a reference sample that an absolute value of difference with an average value is greater than a threshold value may be set to be unavailable when deriving an average value. A threshold value may be predefined in an encoder and a decoder. Alternatively, a threshold value may be determined based on at least one of a size or a shape of a block. Alternatively, information representing a threshold value may be signaled in a bitstream.

Reference samples may be subsampled to reduce complexity for calculation of an average value and an average value may be calculated by using subsampled reference samples.

In an example, when subsampling is performed at an interval of 2 samples, top reference samples positioned at a coordinate of (−1, 2m) may be used to derive an average value or top reference samples positioned at a coordinate of (−1, 2m+1) may be used to derive an average value among top reference samples. In addition, left reference samples positioned at a coordinate of (2n,−1) may be used to derive an average value or left reference samples positioned at a coordinate of (2n+1,−1) may be used to derive an average value among left reference samples. Here, m is a natural number from 0 to (W/2)−1 and n is a natural number from 0 to (H/2)−1. Based on a subsampling rate, a scope of m and n may be determined. According to a size or a shape of a current block, a subsampling rate may be adaptively determined.

In subsampling, a reference sample may be selected at a fixed interval. In this case, a value representing an interval between reference samples may be predefined in an encoder and a decoder. Alternatively, an interval between reference samples may be adaptively determined based on at least one of a size or a shape of a current block. Alternatively, an interval between reference samples may be determined based on index information specifying one of a plurality of candidates.

In another example, after configuring a plurality of set candidates for reference samples, an average value may be derived based on one selected among a plurality of set candidates.

In one example, a first set candidate may include all top reference samples adjoining an upper boundary of a current block and all left reference samples adjoining a left boundary of a current block.

A second set candidate may include top reference samples at a position of (−1, 2m) among top reference samples of a current block and left reference samples at a position of (2n,−1) among left reference samples of a current block.

A third set candidate may include top reference samples at a position of (−1, 2m+1) among top reference samples of a current block and left reference samples at a position of (2n+1, −1) among left reference samples of a current block.

A number and type of set candidates are not limited to the above-described example. It is possible to define more or less set candidates than the above-described example.

An encoder may generate a prediction block per set candidate and determine an optimum set candidate by measuring a cost for each prediction block. And, an index specifying an optimum set candidate may be encoded and signaled in a bitstream.

Alternatively, an optimum set candidate may be determined based on at least one of a size or a shape of a current block.

In another example, one of a set candidate configured with reference samples before subsampling is performed (e.g., at least one of left reference samples and top reference samples) and a set candidate configured with reference samples that subsampling is performed may be selected as an optimum set candidate.

An intra prediction mode of a chroma component may be determined based on an intra prediction mode of a luma component. Concretely, an intra prediction mode of a chroma component is determined by referring to an intra prediction mode of a luma component, but a method of determining an intra prediction mode of a chroma component may be different depending on a chroma mode.

A chroma mode may include at least one of a DC mode, a planar mode, a VER mode, a HOR mode or a DM mode. Table 1 shows a method of deriving an intra prediction mode of a chroma component according to a chroma mode.

TABLE 1

| | Luma Intra Prediction Mode | | | | |
|---|---|---|---|---|---|
| Chroma Mode Index | 0 | 50 | 18 | 1 | X (0 <= X <= 66) |
| 0 (Planar mode) | 66 | 0 | 0 | 0 | 0 |
| 1 (VER mode) | 50 | 66 | 50 | 50 | 50 |
| 2 (HOR mode) | 18 | 18 | 66 | 18 | 18 |
| 3 (DC mode) | 1 | 1 | 1 | 66 | 1 |
| 4 (DM mode) | 0 | 50 | 18 | 1 | X |

Index information for specifying a chroma mode may be signaled in a bitstream. In an example, a chroma mode index indicating one of a DC mode, a planar mode, a VER mode, a HOR mode or a DM mode may be signaled in a bitstream.

In reference to Table 1, when a chroma mode is a planar mode (e.g., when a chroma mode index is 0), an intra prediction mode of a chroma component may be set as a planar mode except when an intra prediction mode of a luma component is 0 (planar).

When a chroma mode is a VER mode (e.g., when a chroma mode index is 1), an intra prediction mode of a chroma component may be set in a vertical direction except when an intra prediction mode of a luma component is 50 (vertical direction).

When a chroma mode is a HOR mode (e.g., when a chroma mode index is 2), an intra prediction mode of a chroma component may be set in a horizontal direction except when an intra prediction mode of a luma component is 18 (horizontal direction).

When a chroma mode is a DC mode (e.g., when a chroma mode index is 3), an intra prediction mode of a chroma component may be set as DC except when an intra prediction mode of a luma component is 1 (DC).

When a chroma mode is a DM mode (e.g., when a chroma mode index is 4), an intra prediction mode of a chroma component may be set to be the same as an intra prediction mode of a luma component.

In an example of Table 1, a CCLM (Cross-component linear mode) mode may be additionally defined as a chroma mode. Table 2 shows an example in which a CCLM mode is added as a new chroma mode.

TABLE 2

| | Luma Intra Prediction Mode | | | | |
|---|---|---|---|---|---|
| Chroma Mode Index | 0 | 50 | 18 | 1 | X (0 <= X <= 66) |
| 0 (Planar mode) | 66 | 0 | 0 | 0 | 0 |
| 1 (VER mode) | 50 | 66 | 50 | 50 | 50 |
| 2 (HOR mode) | 18 | 18 | 66 | 18 | 18 |
| 3 (DC mode) | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 (DM mode) | 0 | 50 | 18 | 1 | X |

In Table 2, it was illustrated that an index assigned to a DM mode changed from No. 4 to No. 7 and CCLM modes are added to No. 4 to No. 6.

A plurality of CCLM modes may be defined. In an example, in Table 2, index 4 to 6 indicate a first CCLM mode (LM mode), a second CCLM mode (LM-A (Above) mode) and a third CCLM mode (LM-L (Left) mode), respectively.

Based on a chroma mode index, whether a chroma mode is a CCLM mode may be determined.

The maximum length of a chroma mode index may be variably determined according to whether a CCLM mode is enabled. In an example, when a CCLM mode is not enabled, a chroma mode index may indicate one of 0 to 4 as illustrated in Table 1. On the other hand, when a CCLM mode is enabled, a chroma mode index may indicate one of 0 to 7 as illustrated in Table 2.

In another example, a flag representing whether a chroma mode is a CCLM mode may be signaled. In an example, when a flag, cclm_mode_flag, is 1, it represents that a chroma mode is a CCLM mode. On the other hand, when a flag, cclm_mode_flag, is 0, it represents that a chroma mode is not a CCLM mode.

When a flag, cclm_mode_flag, is 0, a chroma mode index specifying one of residual chroma modes may be signaled in a bitstream. As whether a CCLM mode is applied is determined by a separate flag, the maximum length of a chroma mode index may have a fixed value regardless of whether a CCLM mode is enabled.

When a flag, cclm_mode_flag, is 1, an index for specifying one of a plurality of CCLM modes may be additionally signaled. In an example, according to an index, cclm_mode_idx, any one of a LM mode, a LM-A mode or a LM-L mode may be determined as a chroma mode.

In another example, based on at least one of a chroma subsampling format, a size and/or a shape of a current block or whether a CCLM is applied to a neighboring block, whether a flag representing whether a CCLM is applied will be used, whether an index specifying one of a plurality of CCLM modes will be used or whether a flag and an index representing whether a CCLM mode is applied will be encoded/decoded before a chroma mode index may be determined.

Under a CCLM mode, a prediction sample of a chroma component may be derived based on a reconstructed luma component sample. Accordingly, redundancy between a luma component sample and a chroma component sample may be removed by using a CCLM mode. Equation 2 shows an example in which a prediction sample of a chroma component is derived under a CCLM mode.

$$Pred_C[y, x] = \alpha \cdot Pred'_L[y, x] + \beta, \quad \text{[Equation 2]}$$

$$(y, x \in \text{coordinates in block})$$

In the Equation 2, Predc means a prediction sample of a chroma component. PredL' represents a reconstructed luma component sample. In addition, α and β represent CCLM parameters. Concretely, α represents a weight and β represents an offset.

Hereinafter, under a CCLM mode, a method of deriving a prediction sample of a chroma component will be described in detail.

Figure 8:
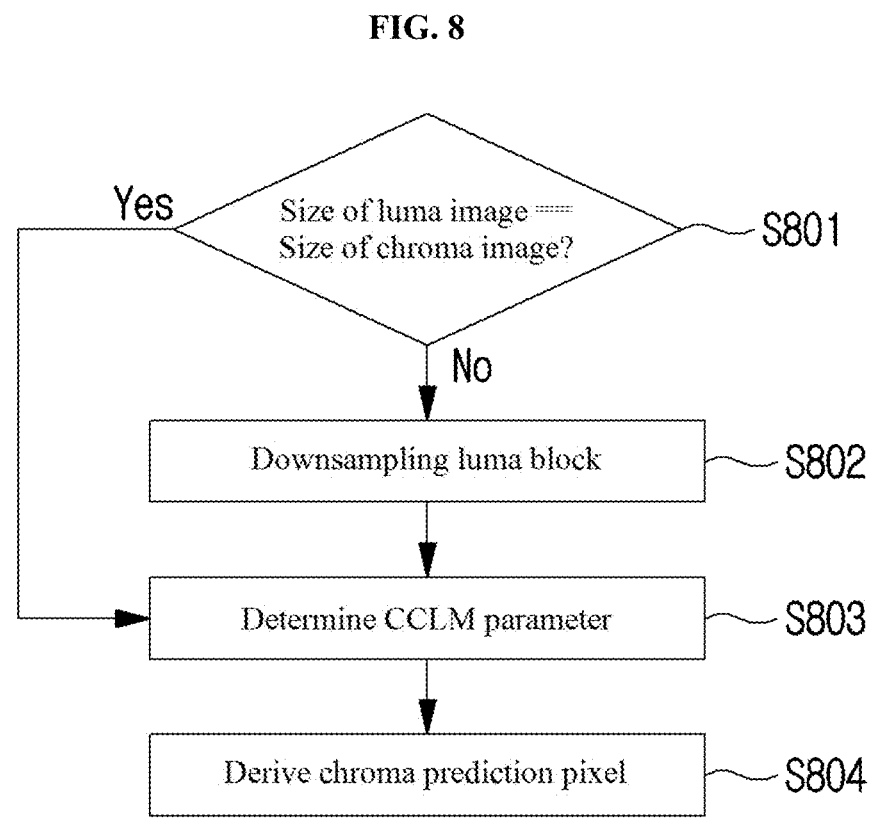

FIG. 8 is a flow diagram showing a method of deriving a prediction sample of a chroma component according to an embodiment of the present disclosure.

First, it is checked whether a size of a luma image is the same as that of a chroma image S801. In an example, when a chroma subsampling format is 4:4:4, it may be determined that a size of a luma image is the same as that of a chroma image. On the other hand, when a chroma subsampling format is 4:2:2 or 4:2:0, it may be determined that a size of a luma image is different from that of a chroma image.

When a size of a luma image is different from that of a chroma image, reconstructed samples included in a luma image may be downsampled S802. A filtered luma block in the same size as a current chroma block may be obtained by applying a downsampling filter to a luma block corresponding to a current chroma block.

When a size of a luma image is the same as that of a chroma image, applying a downsampling filter to a luma block may be omitted.

A type of a downsampling filter may be determined based on at least one of a type of a current image, a CCLM mode type or a position of a sample. For different types of filters, at least one of a shape, the number of taps or a coefficient of a filter may be different. A type of a current image represents whether a current picture is a HDR (High dynamic range) image. A CCLM mode type represents one of a LM mode, a LM-A mode or a LM-L mode.

Information for determining a current image type may be signaled in a bitstream. In an example, a flag representing whether a position of a chroma component sample relatively moves compared with a position of a co-located luma sample may be signaled in a bitstream. When the flag is 1, it represents that a position of a chroma component sample is the same as that of a co-located luma sample. It represents that a current image is a HDR image. On the other hand, When the flag is 0, it represents that a position of a chroma component sample relatively moves down by a 0.5 pixel compared with a position of a co-located luma sample. It represents that a current image is not a HDR image.

According to a size of a luma image and a size of a chroma image, a position of a co-located luma sample corresponding to a chroma sample may be determined. In an example, a position of a co-located luma sample corresponding to a chroma sample at a position of (y, x) may be determined as (y*subHeightC, x*subWidthC). Here, variables subWidthC and subHeightC may be determined based on a chroma subsampling format. In an example, when a chroma subsampling format is 4:4:4, variables subWidthC and subHeightC may be set as 1. When a chroma subsampling format is 4:2:2, variable subWidthC may be set as 2 and variable subHeightC may be set as 1. When a chroma subsampling format is 4:2:0, variables sub WidthC and subHeightC may be set as 2.

Figure 9:
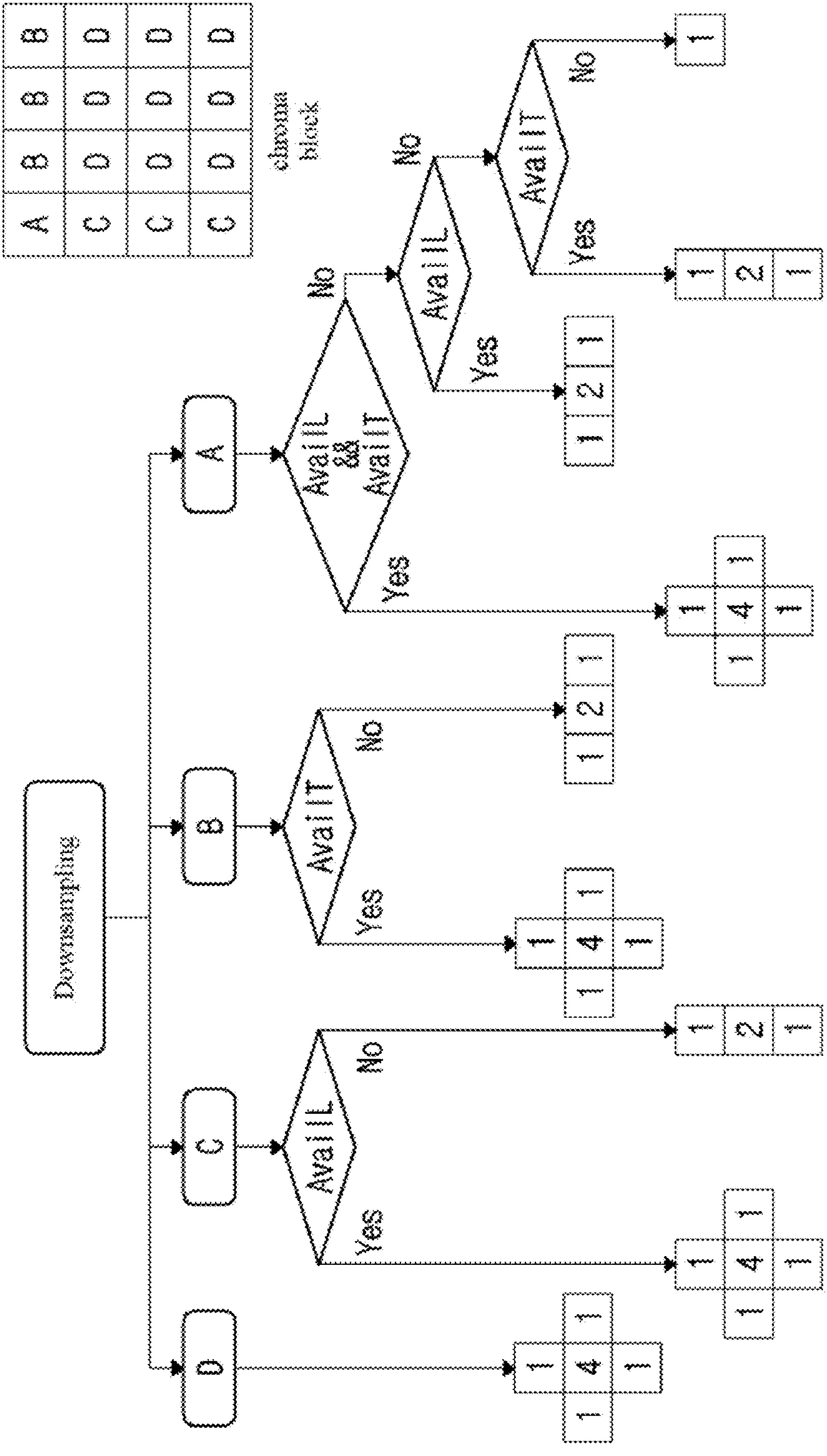
FIG. 9 illustrates a downsampling filter type per chroma sample position when a current image is a HDR image.

FIG. 9 illustrates a downsampling filter type per chroma sample position when a current image is a HDR image.

In a shown example, A represents a sample at a top-left position of a current chroma block. B represents residual samples excluding top-left sample A among samples included in the uppermost row of a current chroma block. C represents residual samples excluding top-left sample A among samples included in the leftmost column of a current chroma block. D represents residual samples excluding samples included in the uppermost row of a current chroma block and samples included in the leftmost column.

Variable AvailL represents whether left neighboring blocks of a luma block are available. Variable AvailT represents whether top neighboring blocks of a luma block are available. Variable AvailL and variable AvailT may be determined based on at least one of a CCLM mode type, whether a neighboring block is encoded by intra prediction, whether a luma block and a neighboring block are included in the same coding tree unit or whether a neighboring block gets out of a boundary of a picture.

A cross-shaped downsampling filter may be applied to a luma sample corresponding to chroma sample D. Concretely, a downsampling filter may be applied to a co-located luma sample of chroma sample D, luma samples neighboring in a horizontal direction of the co-located luma sample and luma samples neighboring in a vertical direction of the co-located luma sample. In this case, a ratio of a filter coefficient applied to a co-located luma sample and a filter coefficient applied to a neighboring luma sample may be 4:1.

A downsampling filter type for a luma sample corresponding to chroma sample C included in the leftmost column in a chroma block may be determined based on variable AvailL. In an example, when left neighboring samples neighboring a luma block are available, a cross-shaped filter may be applied. When a cross-shaped filter is applied, a downsampling filter may be applied to a co-located luma sample of chroma sample C, luma samples neighboring in a horizontal direction of the co-located luma sample and luma samples neighboring in a vertical direction of the co-located luma sample. In this case, a ratio of a filter coefficient applied to a co-located luma sample and a filter coefficient applied to a neighboring luma sample may be 4:1.

On the other hand, when left neighboring samples neighboring a luma block are unavailable, a vertical directional filter may be applied. When a vertical directional filter is applied, a downsampling filter may be applied to a co-located luma sample of chroma sample C and luma samples neighboring in a vertical direction of the co-located luma sample. In this case, a ratio of a filter coefficient applied to a co-located luma sample and a filter coefficient applied to a neighboring luma sample may be 2:1.

A downsampling filter type for a luma sample corresponding to chroma sample B included in the uppermost row in a chroma block may be determined based on variable AvailT. In an example, when top neighboring samples neighboring a luma block are available, a cross-shaped filter may be applied. When a cross-shaped filter is applied, a downsampling filter may be applied to a co-located luma sample of chroma sample B, luma samples neighboring in a horizontal direction of the co-located luma sample and luma samples neighboring in a vertical direction of the co-located luma sample. In this case, a ratio of a filter coefficient applied to a co-located luma sample and a filter coefficient applied to a neighboring luma sample may be 4:1.

On the other hand, when top neighboring samples neighboring a luma block are unavailable, a horizontal directional filter may be applied. When a horizontal directional filter is applied, a downsampling filter may be applied to a co-located luma sample of chroma sample C and luma samples neighboring in a horizontal direction of the co-located luma sample. In this case, a ratio of a filter coefficient applied to a co-located luma sample and a filter coefficient applied to a neighboring luma sample may be 2:1.

A downsampling filter type for a luma sample corresponding to top-left chroma sample A in a chroma sample may be determined based on variable AvailL and variable AvailT. In an example, when all of left neighboring samples and top neighboring samples neighboring a luma block are available, a cross-shaped filter may be applied. When a cross-shaped filter is applied, a downsampling filter may be applied to a co-located luma sample of chroma sample A, luma samples neighboring in a horizontal direction of the co-located luma sample and luma samples neighboring in a vertical direction of the co-located luma sample. In this case, a ratio of a filter coefficient applied to a co-located luma sample and a filter coefficient applied to a neighboring luma sample may be 4:1.

When left neighboring samples neighboring a luma block are available, but top neighboring samples are unavailable, a vertical directional filter may be applied. When a vertical directional filter is applied, a downsampling filter may be applied to a co-located luma sample of chroma sample A and luma samples neighboring in a vertical direction of the co-located luma sample. In this case, a ratio of a filter coefficient applied to a co-located luma sample and a filter coefficient applied to a neighboring luma sample may be 2:1.

When top neighboring samples neighboring a luma block are available, but left neighboring samples are unavailable, a horizontal directional filter may be applied. When a horizontal directional filter is applied, a downsampling filter may be applied to a co-located luma sample of chroma sample A and luma samples neighboring in a horizontal direction of the co-located luma sample. In this case, a ratio of a filter coefficient applied to a co-located luma sample and a filter coefficient applied to a neighboring luma sample may be 2:1.

When all of top neighboring samples and left neighboring samples neighboring a luma block are unavailable, a downsampling filter may not be applied to a co-located luma sample corresponding to chroma sample A.

Figure 10:
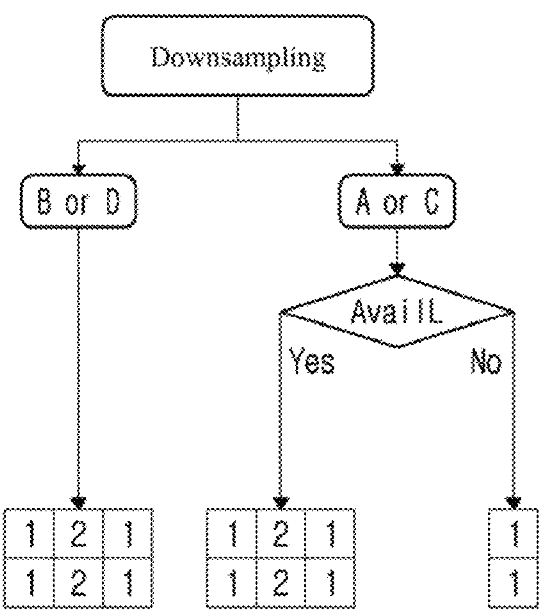
FIG. 10 illustrates a downsampling filter type per chroma sample position when a current image is not a HDR image.

FIG. 10 illustrates a downsampling filter type per chroma sample position when a current image is not a HDR image.

A 6-tap downsampling filter may be applied to a co-located luma sample corresponding to a sample (for example, B and D) included in residual columns excluding the leftmost column of a chroma block. Concretely, a downsampling filter may be applied to horizontal directional neighboring samples respectively neighboring in a horizontal direction of the co-located luma sample and a bottom neighboring sample from the co-located luma sample and the bottom neighboring sample at a bottom position of the co-located luma sample. In this case, a ratio of a filter coefficient applied to a co-located luma sample and a bottom neighboring sample and a filter coefficient applied to horizontal directional neighboring samples may be 2:1.

For a chroma component sample (for example, A and C) included in the leftmost column of a luma block, a downsampling filter in a different shape may be applied according to variable AvailL. In an example, when left neighboring samples of a luma block are available, a 6-tap downsampling filter may be applied to a co-located luma sample corresponding to chroma component sample A or C. On the other hand, when left neighboring samples of a luma block are unavailable, a 2-tap downsampling filter may be applied to a co-located luma sample corresponding to chroma component sample A or C. A 2-tap downsampling filter may be applied to a co-located luma sample and a bottom neighboring sample at a bottom position of the co-located luma sample. In this case, a ratio of a filter coefficient applied to a co-located luma sample and a bottom neighboring sample may be 1:1.

In FIG. 9 and FIG. 10, it was illustrated that a downsampling filter type is determined based on at least one of variable AvailL representing whether left neighboring samples of a luma block are available or variable AvailT representing whether top neighboring samples of a luma block are available.

In another example, a downsampling filter may be determined independently from variable AvailL and variable AvailT. Concretely, regardless of variable AvailL and variable AvailT, a downsampling filter in a fixed shape may be applied.

Figure 11:
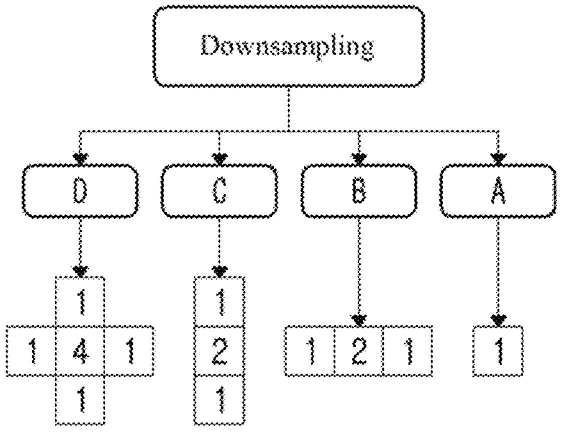
FIGS. 11 and 12 show an example in which a downsampling filter type is determined regardless of availability of neighboring samples adjacent to a luma block.
Figure 12:
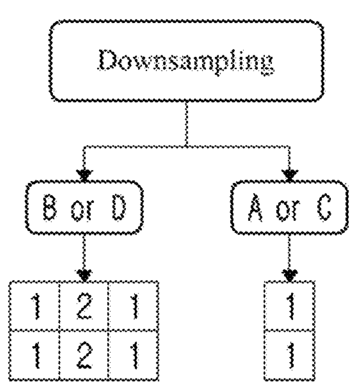

FIGS. 11 and 12 show an example in which a downsampling filter type is determined regardless of availability of neighboring samples adjacent to a luma block. FIG. 11 shows an application aspect of a downsampling filter when a current image is a HDR image and FIG. 12 shows an application aspect of a downsampling filter when a current image is not a HDR image.

In an example, in an example shown in FIG. 11, a downsampling filter corresponding to each chroma sample may be determined without considering availability of neighboring samples adjacent to a luma block.

To this end, a downsampling filter type using neighboring samples adjacent to a luma block may be set to be unavailable. In other words, in an example shown in FIG. 9 and FIG. 10, a downsampling filter selected when variable AvailL and variable AvailT are false may be fixedly applied.

In an example, when a luma block is a HDR image, a cross-shaped filter may be applied to a co-located luma sample corresponding to chroma sample D in a chroma block.

A vertical directional filter may be applied to a co-located luma sample corresponding to chroma sample C in a chroma block.

A horizontal directional filter may be applied to a co-located luma sample corresponding to chroma sample B in a chroma block.

It may be set not to apply a downsampling filter to a co-located luma sample corresponding to chroma sample A in a chroma block.

When a luma block is not a HDR image, a 6-tap downsampling filter may be applied to a co-located luma sample corresponding to chroma sample D or B in a chroma block.

A 2-tap downsampling filter may be applied to a co-located luma sample corresponding to chroma sample A or C in a chroma block.

Contrary to an example shown in FIG. 11 and FIG. 12, a downsampling filter type using a neighboring sample adjacent to a luma block may be fixedly applied to a luma block. In other words, in an example shown in FIG. 9 and FIG. 10, a downsampling filter selected when variable AvailL and variable AvailT are true may be fixedly applied.

In this case, when a neighboring sample adjacent to a luma block is unavailable, pixels positioned on a boundary in a luma block may be padded to a position of an unavailable neighboring sample. In other words, an unavailable neighboring sample may be replaced with pixels positioned on a boundary in a luma block. For example, when left neighboring samples adjacent to the left of a luma block are unavailable, reconstructed samples included in the leftmost column in a luma block may be padded to the left. Alternatively, when top neighboring samples adjacent to the top of a luma block are unavailable, reconstructed samples included in the uppermost row in a luma block may be padded to the top.

In an example shown in FIG. 9 to FIG. 12, it was shown that a different downsampling filter type is determined per each category after classifying each of chroma samples into one of A to D. In this case, it was illustrated that classification of chroma samples is performed based on at least one of whether it is included in the uppermost row or whether a chroma sample is included in the leftmost column.

According to a size of a block, conditions for classification of chroma samples may be set differently. In an example, when a size of a chroma block is 4×4, it may follow classification conditions shown in FIG. 9 to FIG. 12.

On the other hand, when a size of a chroma block is equal to or greater than 16×16, chroma samples may be classified based on whether it is included in 2 uppermost rows in a chroma block or whether it is included in 2 leftmost columns in a chroma block. In an example, when a chroma block is 16×16, chroma samples included in a 2×2-sized top-left region in a chroma block may be classified as A. In addition, residual chroma samples excluding chroma samples classified as A among chroma samples included in 2 uppermost rows in a chroma block may be classified as B. Residual chroma samples excluding chroma samples classified as A among chroma samples included in 2 leftmost columns in a chroma block may be classified as C. Residual chroma samples in a chroma block may be classified as D.

CCLM parameters α and β may be derived based on reconstructed pixels around a chroma block and reconstructed pixels around a luma block S803. When a size of a luma image is different from that of a chroma image, reconstructed pixels around a luma block may be downsampled.

CCLM parameters may be derived based on at least one of top neighboring samples adjacent to the top of a luma block and a chroma block or left neighboring blocks adjacent to the left of a luma block and a chroma block.

According to a CCLM mode, when deriving CCLM parameters, whether top neighboring samples and left neighboring samples are used may be determined. In an example, under a LM mode, CCLM parameters may be derived based on top neighboring samples and left neighboring samples. Under a LM-A mode, CCLM parameters may be derived based on only top neighboring samples. Under a LM-L mode, CCLM parameters may be derived based on only left neighboring samples.

Alternatively, the number or a scope of neighboring reconstructed pixels may be determined based on at least one of a size or a shape of a current block, a type of a current image, a CCLM mode type or a chroma subsampling format.

Figure 13:
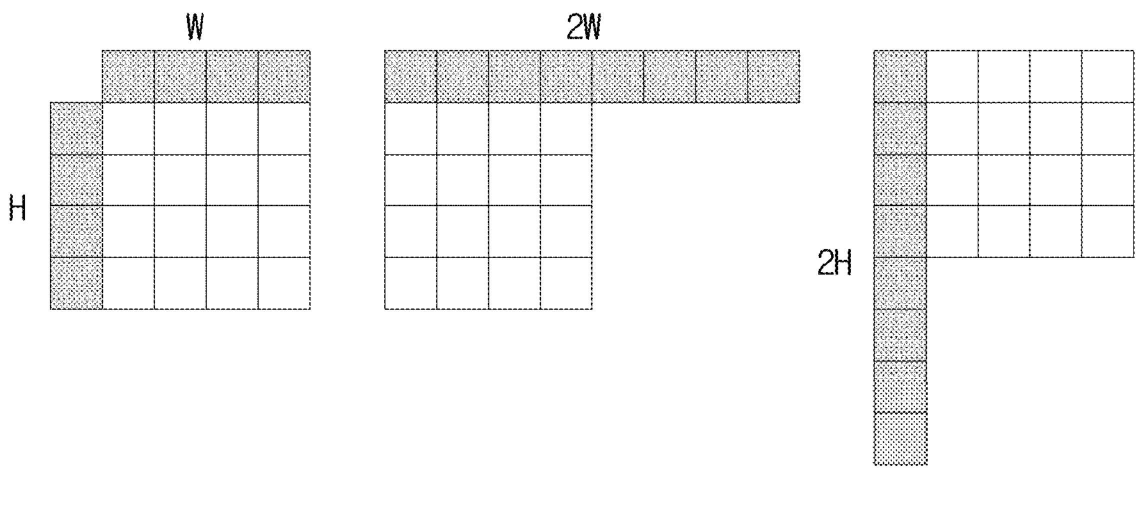
FIG. 13 shows an example in which a scope of reconstructed pixels used to derive a CCLM parameter is set differently according to a CCLM mode type.

FIG. 13 shows an example in which a scope of reconstructed pixels used to derive a CCLM parameter is set differently according to a CCLM mode type.

For convenience of a description, it is assumed that both W, a width of a chroma block, and H, a height, are 4.

When a LM mode is applied to a chroma block, a CCLM parameter may be derived by using W top neighboring samples adjoining an upper boundary of a chroma block and H left neighboring samples adjoining a left boundary of a chroma block.

When a LM-A mode is applied to a chroma block, a CCLM parameter may be derived by using 2W top neighboring samples adjacent to the top of a chroma block.

When a LM-L mode is applied to a chroma block, CCLM parameters may be derived by using 2H left neighboring samples adjacent to the left of a chroma block.

Alternatively, after subsampling neighboring samples adjacent to a chroma block, CCLM parameters may be derived by using only subsampled neighboring samples.

In an example, when a LM mode is applied to a chroma block, W top neighboring samples adjoining an upper boundary of a chroma block may be subsampled at 2 intervals and H left neighboring samples adjoining a left boundary of a chroma block may be subsampled at 2 intervals. Equation 3 represents a position combination of subsampled neighboring samples used to derive a CCLM parameter under a LM mode.

$$(-1, W/4), (-1, 3W/4), (H/4, -1), (3H/4, -1) \quad \text{[Equation 3]}$$

In the Equation 3, a first value in brackets represents a y-coordinate of a neighboring sample and a second value represents an x-coordinate of a neighboring sample.

When a LM-A mode is applied to a chroma block, 2W top neighboring samples adjacent to the top of a chroma block may be subsampled. Equation 4 represents a position combination of subsampled neighboring samples used to derive a CCLM parameter.

$$(-1, W/4), (-1, 3W/4), (-1.5W/4), (-1, 7W/4) \quad \text{[Equation 4]}$$

When a LM-L mode is applied to a chroma block, 2H left neighboring samples adjacent to the left of a chroma block may be subsampled. Equation 5 represents a position combination of subsampled neighboring samples used to derive a CCLM parameter.

$$(H/4, -1), (3H/4, -1), (5H/4, -1), (7H/4, -1) \quad \text{[Equation 5]}$$

A co-located luma sample corresponding to a neighboring chroma sample may be extracted from a luma image. In this case, when a size of a luma image is different from that of a chroma image, a luma sample to which a downsampling filter is applied may be derived.

A downsampling filter may be applied to a co-located luma pixel and neighboring samples neighboring the co-located luma pixel.

A type of a downsampling filter may be determined based on a type of a current image, a position of a co-located luma pixel, variable AvailL, variable AvailT or whether a current block adjoins a boundary of a coding tree unit. For different types of filters, at least one of a shape, the number of taps or a coefficient of a filter may be different.

Hereinafter, an example of deriving a filtered luma sample of a top neighboring block neighboring the top of a chroma block and an example of deriving a filtered luma sample of a left neighboring block neighboring the left of a chroma block will be described in detail.

Reconstructed samples included in up to N lines from an upper boundary of a luma block may be used to derive a filtered luma sample for a top neighboring sample neighboring the top of a chroma block. In this case, the number of lines may be determined based on at least one of a chroma subsampling format, a CCLM mode type, an image type, a shape or a size of a current block, whether a current block adjoins a boundary of a coding tree unit or a type of a downsampling filter. In the present disclosure, it is assumed that when applying a downsampling filter for a co-located luma sample at a top position of a luma block, reconstructed samples included in 2 rows around an upper boundary of a luma block are used.

FIG. 14 illustrates a downsampling filter type applied to a collocated luma sample of a top neighboring sample when a current image is not a HDR image.

Figure 15:
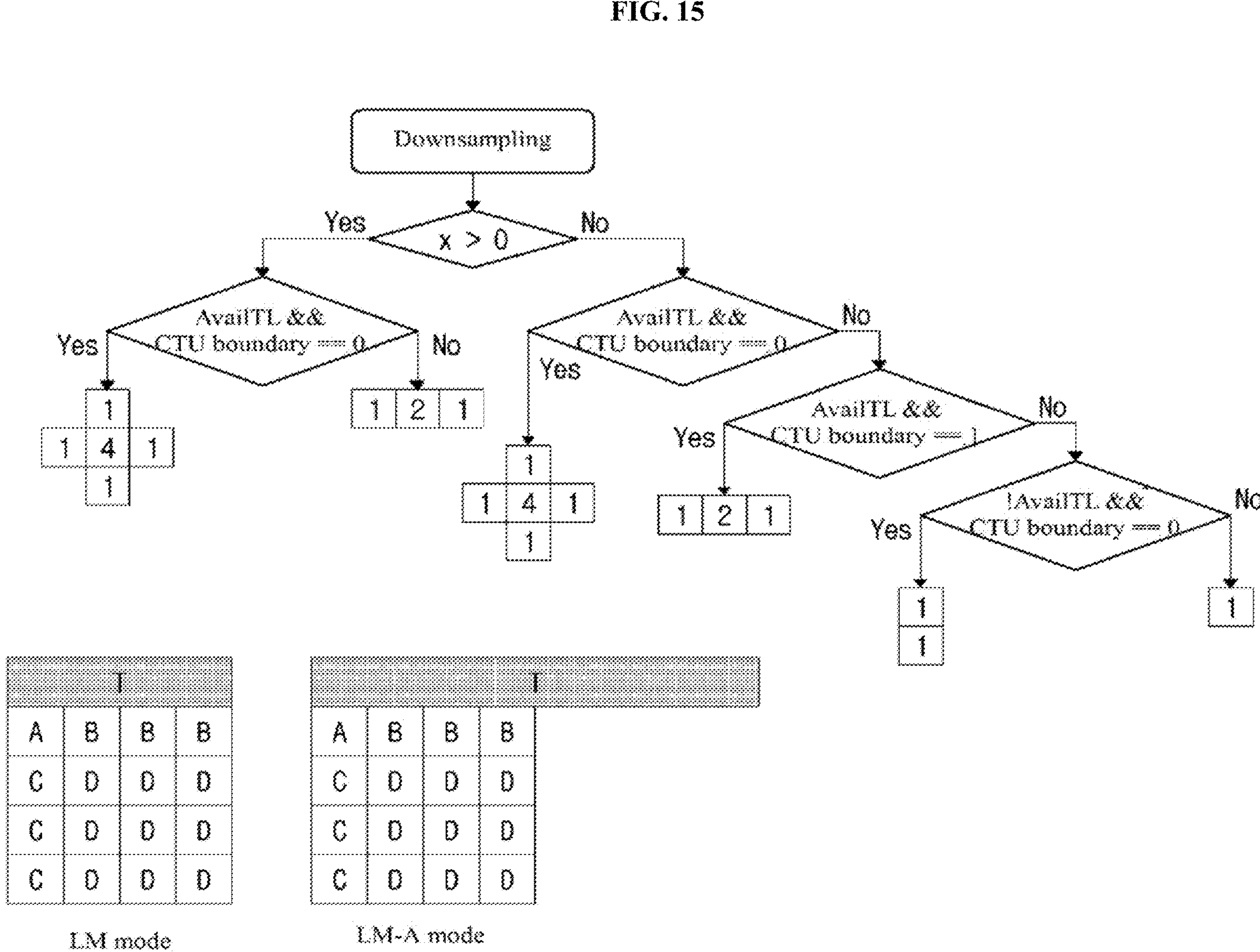
FIG. 15 illustrates a downsampling filter type applied to a co-located luma sample of a top neighboring sample when a current image is a HDR image.

FIG. 15 illustrates a downsampling filter type applied to a collocated luma sample of a top neighboring sample when a current image is a HDR image.

In an example shown in FIG. 14 and FIG. 15, variable AvailTL may be derived by applying an AND operator between variable AvailL and variable AvailT. In other words, when all of left neighboring samples and top neighboring samples are available, a value of variable AvailTL may be set as 1 and when at least one of left neighboring samples and top neighboring samples are unavailable, variable AvailTL may be set as 0.

A downsampling filter type applied to a co-located luma sample may be determined based on at least one of variable AvailL, variable AvailT, a position of a top neighboring sample and whether a current block adjoins an upper boundary of a coding tree unit.

First, when a current image is not a HDR image, an application aspect of a downsampling filter is described.

For a chroma component top neighboring sample that an x-axis coordinate is greater than 0, when all of top neighboring samples and left neighboring samples are available and a current block does not adjoin an upper boundary of a coding tree unit, a 6-tap downsampling filter may be applied to a co-located luma sample. Concretely, a downsampling filter may be applied to horizontal directional neighboring samples respectively neighboring in a horizontal direction of a co-located sample and a bottom neighboring sample from the co-located luma sample and the bottom neighboring sample at a bottom position of the co-located sample. In this case, a ratio of a filter coefficient applied to a co-located sample and a bottom neighboring sample and a filter coefficient applied to horizontal directional neighboring samples may be 2:1.

On the other hand, when at least one of top neighboring samples and left neighboring samples are unavailable and a current block adjoins an upper boundary of a coding tree unit, a horizontal directional filter may be applied to a co-located luma sample. Concretely, a downsampling filter may be applied to a co-located luma sample and luma samples neighboring in a horizontal direction of the co-located luma sample. In this case, a ratio of a filter coefficient applied to a co-located luma sample and a filter coefficient applied to a neighboring luma sample may be 2:1.

For a chroma component top neighboring sample that an x-axis coordinate is equal to or less than 0, when all of top neighboring samples and left neighboring samples are available and a current block does not adjoin an upper boundary of a coding tree unit, a 6-tap downsampling filter may be applied to a co-located luma sample.

When all of top neighboring samples and left neighboring samples are available, but a current block adjoins an upper boundary of a coding tree unit, a horizontal directional downsampling filter may be applied.

On the other hand, when a current coding block does not adjoin an upper boundary of a coding tree unit, but at least one of top neighboring samples and left neighboring samples are unavailable, a 2-tap vertical directional filter may be applied to a co-located luma sample. A 2-tap vertical directional filter may be applied to a co-located luma sample and a bottom neighboring sample at a bottom position of the co-located luma sample. In this case, a ratio of a filter coefficient applied to a co-located luma sample and a bottom neighboring sample may be 1:1.

On the other hand, when at least one of top neighboring samples and left neighboring samples are unavailable and a current block adjoins an upper boundary of a coding tree unit, it may be set not to apply a downsampling filter to a co-located luma sample.

Next, when a current image is a HDR image, an application aspect of a downsampling filter is described.

For a chroma component top neighboring sample that an x-axis coordinate is greater than 0, when all of top neighboring samples and left neighboring samples are available and a current block does not adjoin an upper boundary of a coding tree unit, a cross-shaped filter may be applied to a co-located luma sample. Concretely, a downsampling filter may be applied to a co-located luma sample, luma samples neighboring in a horizontal direction of the co-located sample and luma samples neighboring in a vertical direction of the co-located luma sample. In this case, a ratio of a filter coefficient applied to a co-located luma sample and a filter coefficient applied to a neighboring luma sample may be 4:1.

On the other hand, when at least one of top neighboring samples and left neighboring samples are unavailable or a current block adjoins an upper boundary of a coding tree unit, a horizontal directional filter may be applied to a co-located luma sample. Concretely, a downsampling filter may be applied to a co-located luma sample and luma samples neighboring in a horizontal direction of the co-located luma sample. In this case, a ratio of a filter coefficient applied to a co-located luma sample and a filter coefficient applied to a neighboring luma sample may be 2:1.

For a chroma component top neighboring sample that an x-axis coordinate is equal to or less than 0, when all of top neighboring samples and left neighboring samples are available and a current block does not adjoin an upper boundary of a coding tree unit, a cross-shaped filter may be applied to a co-located luma sample.

When all of top neighboring samples and left neighboring samples are available, but a current block adjoins an upper boundary of a coding tree unit, a horizontal directional downsampling filter may be applied.

On the other hand, when a current coding block does not adjoin an upper boundary of a coding tree unit, but at least one of top neighboring samples and left neighboring samples are unavailable, it may be set not to apply a downsampling filter to a co-located luma sample.

Even when at least one of top neighboring samples and left neighboring samples are unavailable and a current block adjoins an upper boundary of a coding tree unit, it may be set not to apply a downsampling filter to a co-located luma sample.

In an example shown in FIG. 14 and FIG. 15, it was illustrated that a downsampling filter type applied to a co-located luma sample is determined based on an image type, variable AvailTL and whether a current block adjoins an upper boundary of a coding tree unit.

In another example, a downsampling filter type may be determined regardless of at least one of an image type, variable AvailTL or whether a current block adjoins an upper boundary of a coding tree unit.

Figure 16:
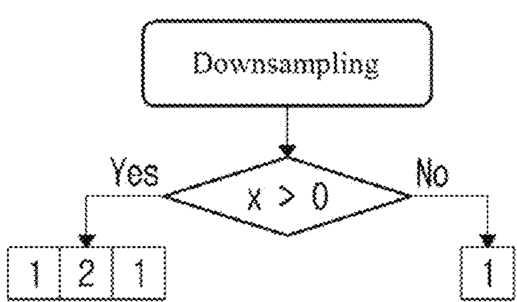
FIG. 16 shows an example to which a filter in a fixed type is applied according to a position of a top neighboring sample.

FIG. 16 shows an example to which a filter in a fixed type is applied according to a position of a top neighboring sample.

Regardless of whether a current image is a HDR image, when an x-coordinate of a chroma component top neighboring sample is greater than 0, a horizontal directional filter may be applied to a co-located luma sample.

On the other hand, when an x-axis coordinate of a chroma component top neighboring sample is equal to or less than 0, a downsampling filter may not be applied to a co-located luma sample.

In another example, by considering whether a current image is a HDR image, when a current image is a HDR image, a first type of a downsampling filter may be applied to all top neighboring samples. On the other hand, when a current image is not a HDR image, a second type of a downsampling filter may be applied to all top neighboring samples.

Here, for a first type and a second type, at least one of a filter shape, the number of taps or a coefficient may be different. In an example, a first type downsampling filter may represent a 3-tap horizontal directional filter and a second type downsampling filter may represent a 6-tap filter.

In this case, when a neighboring sample adjacent to a luma block is unavailable, available reconstructed samples may be padded to a position of an unavailable neighboring sample. In an example, when left neighboring samples adjacent to the left of a luma block are unavailable, reconstructed samples included in the leftmost column in a luma block may be padded to the left. Alternatively, when top neighboring samples adjacent to the top of a luma block are unavailable, reconstructed samples included in the uppermost row in a luma block may be padded to the top.

By padding a position of an unavailable sample, a downsampling filter type may be determined without considering availability of neighboring samples.

Next, a method of deriving a filtered luma sample for a left neighboring sample will be described.

When deriving a filtered luma sample, reconstructed samples included in up to M lines from a left boundary of a luma block may be used. In this case, the number of lines may be determined based on at least one of a chroma subsampling format, a CCLM mode type, an image type, a shape or a size of a current block, whether a current block adjoins a boundary of a coding tree unit or a type of a downsampling filter. In the present disclosure, it is assumed that when applying a downsampling filter for a co-located luma sample at a left position of a luma block, reconstructed samples included in 3 columns around a left boundary of a luma block are used.

A downsampling filter may be applied to a co-located luma pixel and neighboring pixels neighboring the co-located luma pixel.

Figure 17:
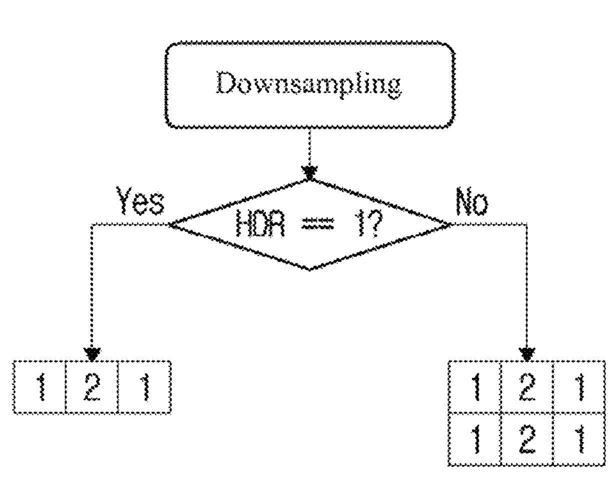
FIG. 17 illustrates a downsampling filter type applied to a co-located luma sample of a left neighboring sample.

FIG. 17 illustrates a downsampling filter type applied to a co-located luma sample of a left neighboring sample.

A downsampling filter type applied to a co-located luma sample may be determined based on at least one of an image type, variable AvailL, variable AvailT and a position of a left neighboring sample.

First, when a current image is a HDR image, an application aspect of a downsampling filter is described.

When all of top neighboring samples and left neighboring samples are available, a cross-shaped filter may be applied to a co-located luma sample. Concretely, a downsampling filter may be applied to a co-located luma sample, luma samples neighboring in a horizontal direction of the co-located sample and luma samples neighboring in a vertical direction of the co-located luma sample. In this case, a ratio of a filter coefficient applied to a co-located luma sample and a filter coefficient applied to a neighboring luma sample may be 4:1.

When a y-axis coordinate of a chroma component top neighboring sample is greater than 0, a cross-shaped filter may be applied to a co-located luma sample regardless of availability of left neighboring reference samples and top neighboring reference samples.

When a y-axis coordinate of a chroma component top neighboring sample is equal to or less than 0 and at least one of left neighboring reference samples and top neighboring reference samples is unavailable, a horizontal directional downsampling filter may be applied. Concretely, a downsampling filter may be applied to a co-located luma sample and luma samples neighboring in a horizontal direction of the co-located sample. In this case, a ratio of a filter coefficient applied to a co-located luma sample and a filter coefficient applied to horizontal directional neighboring samples may be 2:1.

When a current image is not a HDR image, a 6-tap downsampling filter may be applied to a co-located luma sample. Concretely, a downsampling filter may be applied to horizontal directional neighboring samples respectively neighboring in a horizontal direction of a co-located sample and a bottom neighboring sample from the co-located luma sample and the bottom neighboring sample at a bottom position of the co-located sample. In this case, a ratio of a filter coefficient applied to a co-located sample and a bottom neighboring sample and a filter coefficient applied to horizontal directional neighboring samples may be 2:1.

In an example shown in FIG. 16, it was illustrated that a downsampling filter type applied to a co-located luma sample is determined based on an image type and variable AvailTL.

In another example, a downsampling filter type may be determined regardless of at least one of an image type or variable AvailTL.

FIG. 17 shows an example to which a filter in a fixed type is applied according to a type of a current image.

When a current image is a HDR image, a horizontal directional filter may be applied to a co-located luma sample.

On the other hand, when a current image is not a HDR image, a 6-tap downsampling filter may be applied to a co-located luma sample.

In this case, when a neighboring sample adjacent to a luma block is unavailable, available reconstructed samples may be padded to a position of an unavailable neighboring sample. In an example, when left neighboring samples adjacent to the left of a luma block are unavailable, reconstructed samples included in the leftmost column in a luma block may be padded to the left. Alternatively, when top neighboring samples adjacent to the top of a luma block are unavailable, reconstructed samples included in the uppermost row in a luma block may be padded to the top.

By padding a position of an unavailable sample, a downsampling filter type may be determined without considering availability of neighboring samples.

Information on a method of determining a downsampling filter may be signaled in a bitstream. In an example, information specifying one of a first method in which a downsampling filter type is determined by considering at least one of an image type, variable AvailTL or whether a current block adjoins an upper boundary of a coding tree unit or a second method in which a downsampling filter type is determined regardless of at least one of the conditions may be signaled in a bitstream.

In another example, at least one of a first method or a second method may be selected based on at least one of a type of a current image, a size and/or a shape of a current block, whether a current block is adjacent to an upper boundary of a coding tree unit, a chroma subsampling format, a CCLM mode type, variable AvailL, variable AvailT or variable AvailTL.

Alternatively, as described above, a filter type may be determined by considering only whether a current image is a HDR image. In an example, when a current image is a HDR image, only a first type of a downsampling filter may be fixedly applied to a top neighboring sample or a left neighboring sample, and when a current image is not a HDR image, only a second type of a downsampling filter may be fixedly applied to a top neighboring sample or a left neighboring sample. Here, for a first type and a second type, at least one of a filter shape, the number of taps or a coefficient may be different.

In this case, padding may be pre-performed to N rows around an upper boundary of a luma block and/or M rows around a left boundary of a luma block. As padding is performed, all neighboring samples around a luma block may be set to be available, and accordingly, a filter type may be determined regardless of whether neighboring samples are available.

In an example shown in FIG. 13, it was described that neighboring samples used to derive CCLM parameters are selected through subsampling. In this case, a position of subsampled neighboring samples may be set as a combination different from a described example. In an example, according to the following Equation 6, instead of Equation 3, subsampled neighboring samples may be derived.

$$(-1, a\cdot W/c), (-1, b\cdot W/c), (a\cdot H/c, -1), (b\cdot H/c, -1) \quad \text{[Equation 6]}$$

In the Equation 6, W and H represent a width and a height of a current chroma block, respectively. In Equation 6, a combination of variables a, b and c may be determined based on one of the following Table 3.

TABLE 3

| (a, b) | c |
|---|---|
| (3, 5) | 8 |
| (5, 11) | 16 |
| (11, 21) | 32 |
| (21, 43) | 64 |

It may be effective to subsample neighboring samples by using one combination of Equation 6 and Table 3, instead of subsampling neighboring samples by using Equation 3, to properly keep an interval of neighboring samples to be subsampled. In an example, when subsampling is performed by using Equation 3, an interval between 2 samples to be subsampled may be changed in a nonuniform way as a width or a height of a current block is greater than the other. On the other hand, when one of variables defined in Equation 6 and Table 3 is used, an interval between 2 samples to be subsampled may be kept more uniformly compared with a case in which Equation 3 is used.

One of variable combinations defined in Table 3 may be selected based on at least one of a size or a shape of a current block, a CCLM mode type, a type of a current image and a chroma subsampling format. In an example, at least one of a width or a height of a current block may be set as variable c and a combination of (a, b) corresponding to determined variable c may be called. In an example, when at least one of a width or a height of a current block is 4, a combination of (a, b) may be set as (3, 5), when at least one of a width or a height of a current block is 8, a combination of (a, b) may be set as (5, 11), when at least one of a width or a height of a current block is 16, a combination of (a, b) may be set as (11, 21) and when at least one of a width or a height of a current block is equal to or greater than 32, a combination of (a, b) may be set as (21, 43).

When a current block has a non-square shape, a combination of variables for a horizontal direction may be set to be different from a combination of variables for a vertical direction. In an example, subsampling for top neighboring samples of a current block may be performed by calling a combination of (a, b) corresponding to set variable c after setting W, a width of a current block, as variable c. On the other hand, subsampling for left neighboring samples of a current block may be performed by calling a combination of (a, b) corresponding to set variable c after setting H, a width of a current block, as variable c.

In another example, information for specifying at least one of variables a, b and c may be signaled in a bitstream. In an example, information for specifying each of variables a, b and c may be signaled through a sequence parameter set or a picture parameter set.

Alternatively, index information specifying one of combinations of variables a, b and c may be signaled in a bitstream.

Alternatively, a value of variables a, b and c may be fixed in an encoder and a decoder.

The number of chroma samples to be subsampled may be increased or decreased compared with those described in the Equation 3 to 5. In this case, the number of chroma samples to be subsampled may be determined based on at least one of a size or a shape of a current block, a type of a current image, whether a current block adjoins a boundary of a coding tree unit, a CCLM mode type, a chroma subsampling format, variable AvailT, variable AvailL or variable AvailTL.

In an example, in an example shown in FIG. 13, it was described that when a chroma block has a 4×4 size, a total of 4 neighboring samples are selected by subsampling.

When a size of a chroma block is greater than 4×4, more neighboring samples may be selected. In an example, when a total of 8 neighboring samples are to be selected, Equation 3 to 5 may be changed into the following Equation 7 to 9.

$$(-1, 0W/4), (-1, W/4), (-1, 2W/4), (-1, 3W/4), (0H/4, -1), (1H/4, -1), (2H/4, -1), (3H/4-1) \quad \text{[Equation 7]}$$

$$(-1, 0W/4), (-1, W/4), (-1, 2W/4), (-1, 3W/4), (-1, 4W/4), (-1, 5W/4), (-1, 6W/4), (-1, 7W/4) \quad \text{[Equation 8]}$$

$$(0H/4, -1), (1H/4, -1), (2H/4, -1), (3H/4, -1), (4H/4, -1), (5H/4, -1), (6H/4, -1), (7H/4, -1) \quad \text{[Equation 9]}$$

Equation 7 to Equation 9 represent a combination of subsampled neighboring samples under a LM mode, a LM-A mode and a LM-L mode, respectively.

The number of subsampled neighboring samples may be adjusted based on a size of a current block. In an example, when a current block is smaller than a threshold value, W×H, 4 neighboring samples may be selected. On the other hand, when a current block is equal to or greater than a threshold value, W×H, 8 neighboring samples may be selected.

In the above-described embodiments, it was illustrated that a downsampling filter is applied to a co-located luma sample corresponding to a chroma sample to derive a CCLM parameter. In another example, a CCLM parameter may be derived without applying a downsampling filter to a co-located luma sample. Here, when a downsampling filter is not applied, it represents that a value of a co-located luma sample is used as it is in deriving a CCLM parameter.

In another example, whether a downsampling filter is applied may be determined according to the number of neighboring samples. In an example, when 4 neighboring samples are selected, a downsampling filter may be applied to a co-located luma sample. On the other hand, when 8 neighboring samples are selected, a downsampling filter may not be applied to a co-located luma sample.

In another example, a downsampling filter type may be adaptively determined according to the number of neighboring samples. In an example, for a case in which 4 neighboring samples are selected and a case in which 8 neighboring samples are selected, at least one of a shape, the number of taps or a coefficient of a downsampling filter may be different.

Specificity of a reconstructed pixel may be removed or alleviated by applying a low pass filter to a chroma image or a luma image. In an example, before selecting neighboring samples around a chroma block, a low pass filter may be applied. When a low pass filter is applied, block characteristics may be reflected better when a CCLM parameter is derived.

A low pass filter may be set to be applied only to a chroma image. It is because that for a reconstructed pixel in a luma image, specificity of a reconstructed pixel may be removed or alleviated through a downsampling filter.

In another example, a low pass filter may be applied both to a chroma image and a luma image.

Information representing whether a low pass filter will be applied may be signaled in a bitstream. The information may be signaled for each of a luma component and a chroma component.

CCLM parameters $\alpha$ and $\beta$ may be derived by using neighboring samples neighboring a chroma block and neighboring samples neighboring a luma block.

When deriving a CCLM parameter, luma component neighboring samples may be classified into 2 groups. The classification may be based on a value of neighboring samples. In an example, when 4 neighboring samples are selected, 2 largest values among 4 neighboring samples may be classified into a first group and 2 smallest values may be classified into a second group.

Chroma component neighboring samples may be also classified into 2 groups. The classification may be based on a classification result of luma components. In other words, if a neighboring luma sample is classified into a N-th group, a neighboring chroma sample corresponding to it may be also classified into a N-th group.

Subsequently, for each of a luma component and a chroma component, a sample average value per each group may be derived. In an example, for a luma component, an average value Xb may be derived by averaging neighboring luma samples belonging to a first group and an average value Xa may be derived by averaging neighboring luma samples belonging to a second group. In addition, for a chroma component, an average value Yb may be derived by averaging neighboring chroma samples belonging to a first group and an average value Ya may be derived by averaging neighboring chroma samples belonging to a second group.

A CCLM parameter may be derived based on derived average values. In an example, weight α and offset β may be derived based on the following Equation 10 and 11.

$$\alpha = (Y_a - Y_b)/(X_a - X_b) \quad \text{[Equation 10]}$$

$$\beta = Y_a - \alpha X_a \quad \text{[Equation 11]}$$

When a CCLM parameter is derived, a chroma sample may be predicted by using a downsampled luma sample S804. Concretely, a chroma prediction sample may be derived by adding offset β to a multiplication of a down-sampled luma sample and weight α.

Luma component neighboring samples and chroma component neighboring samples may be classified into 3 or more groups. In an example, n of N luma neighboring samples may be classified into a first group, m luma neighboring samples may be classified into a second group and (N-n-m) luma neighboring samples may be classified into a third group. The classification may be based on a value of neighboring luma samples.

Chroma component neighboring samples may be also classified into 3 or more groups by referring to a classification result of luma component neighboring samples.

When neighboring samples are classified into 3 or more groups, a CCLM parameter may be derived by using only 2 groups of 3 or more groups. In an example, a CCLM parameter may be derived by using a group including a neighboring sample with the largest value and a group including a neighboring sample with the smallest value.

In the above-described example, it was described that chroma neighboring samples are classified by referring to a classification result of luma neighboring samples. Contrary to a described example, luma neighboring samples may be classified by referring to a classification result of chroma neighboring samples after classifying chroma neighboring samples.

In another example, neighboring luma samples and neighboring chroma samples may be independently classified into a plurality of groups.

Syntaxes used in the above-described embodiments are just named for convenience of a description.

When embodiments described based on a decoding process or an encoding process are applied to an encoding process or a decoding process, it is included in a scope of the present disclosure. When embodiments described in a predetermined order are changed in an order different from a description, it is also included in a scope of the present disclosure.

The above-described embodiment is described based on a series of stages or flow charts, but it does not limit a time series order of the present disclosure and if necessary, it may be performed at the same time or in a different order. In addition, each component (e.g., a unit, a module, etc.) configuring a block diagram in the above-described embodiment may be implemented as a hardware device or a software and a plurality of components may be combined and implemented as one hardware device or software. The above-described embodiment may be recorded in a computer readable recoding medium by being implemented in a form of a program instruction which may be performed by a variety of computer components. The computer readable recoding medium may include a program instruction, a data file, a data structure, etc. solely or in combination. A hardware device which is specially configured to store and perform magnetic media such as a hard disk, a floppy disk and a magnetic tape, optical recording media such as CD-ROM, DVD, magneto-optical media such as a floptical disk and a program instruction such as ROM, RAM, a flash memory, etc. is included in a computer readable recoding medium. The hardware device may be configured to operate as one or more software modules in order to perform processing according to the present disclosure and vice versa.

INDUSTRIAL APPLICABILITY

The present disclosure may be applied to an electronic device which may encode/decode an image.

What is claimed is:

1. A method of decoding a video, comprising:

determining whether a CCLM (Cross-Component Linear Model) mode is applied to a chroma block;

in response to the CCLM mode being applied to the chroma block, deriving a CCLM parameter based on neighboring chroma samples of the chroma block and filtered neighboring luma samples;

obtaining a prediction sample of the chroma block based on a down-sampled luma sample and the CCLM parameter; and obtaining a reconstruction sample of the chroma block based on the prediction sample, wherein the down-sampled luma sample is obtained based on a collocated luma sample in a luma block and neighboring luma samples adjacent to the collocated luma sample, a position of the collocated luma sample in the luma block being corresponding to a position of the prediction sample in the chroma block, wherein when a neighboring luma sample adjacent to the collocated luma sample is unavailable, the neighboring luma sample is set equal to the collocated luma sample, wherein the neighboring chroma samples are positioned at sub-sampled positions outside the chroma block, and wherein a subsampling rate for determining the sub-sampled positions is determined based on at least one of a size or a shape of the chroma block.

2. The method of claim 1, wherein the filtered neighboring luma sample is generated by applying a down-sampling filter to a reference luma sample at a position corresponding to the neighboring chroma sample.

3. The method of claim 2, wherein a type of the down-sampling filter applied to the reference luma sample is determined based on a type of a current image.

4. The method of claim 3, wherein the type of the current image is determined either of a HDR (High Dynamic Range) type or a non-HDR type, and wherein a shape of the down-sample filter is different between when the current image is the HDR type and when the current image is the non-HDR type.

5. A method of encoding a video, comprising:

deriving a CCLM (Cross-Component Linear Model) parameter based on neighboring chroma samples of a chroma block and filtered neighboring luma samples;

obtaining a prediction sample of the chroma block based on a down-sampled luma sample and the CCLM parameter;

obtaining a residual sample of the chroma block by subtracting the prediction sample from an original sample; and encoding information indicating whether a CCLM mode is applied to the chroma block, wherein the down-sampled luma sample is obtained based on a collocated luma sample in a luma block and neighboring luma samples adjacent to the collocated luma sample, a position of the collocated luma sample in the luma block being corresponding to a position of the prediction sample in the chroma block, wherein when a neighboring luma sample adjacent to the collocated luma sample is unavailable, the neighboring luma sample is set equal to the collocated luma sample, wherein the neighboring chroma samples are positioned at sub-sampled positions outside the chroma block, and wherein a subsampling rate for determining the sub-sampled positions is determined based on at least one of a size or a shape of the chroma block.

6. A device for transmitting compressed video data, the device comprising:

a processor configured to obtain the compressed video data; and a transmitting unit configured to transmit the compressed video data, wherein obtaining the compressed video comprises:

deriving a CCLM (Cross-Component Linear Model) parameter based on neighboring chroma samples of a chroma block and filtered neighboring luma samples;

obtaining a prediction sample of the chroma block based on a down-sampled luma sample and the CCLM parameter;

obtaining a residual sample of the chroma block by subtracting the prediction sample from an original sample; and encoding information indicating whether a CCLM mode is applied to the current block, wherein the down-sampled luma sample is obtained based on a collocated luma sample in a luma block and neighboring luma samples adjacent to the collocated luma sample, a position of the collocated luma sample in the luma block being corresponding to a position of the prediction sample in the chroma block, wherein when a neighboring luma sample adjacent to the collocated luma sample is unavailable, the neighboring luma sample is set equal to the collocated luma sample, wherein the neighboring chroma samples are positioned at sub-sampled positions outside the chroma block, and wherein a subsampling rate for determining the sub-sampled positions is determined based on at least one of a size or a shape of the chroma block.

* * * * *